United States Patent
Pawlowski et al.

(10) Patent No.: US 9,762,460 B2
(45) Date of Patent: Sep. 12, 2017

(54) PROVIDING CONTINUOUS CONTEXT FOR OPERATIONAL INFORMATION OF A STORAGE SYSTEM

(71) Applicant: NetApp, Inc., Sunnyvale, CA (US)

(72) Inventors: Brian J. Pawlowski, Palo Alto, CA (US); Daniel Nghia Truong, San Jose, CA (US); Brian M. Hackworth, San Jose, CA (US); Jing Shi, San Jose, CA (US); Mrinmoy Majumdar, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 66 days.

(21) Appl. No.: 14/667,263

(22) Filed: Mar. 24, 2015

(65) Prior Publication Data
US 2016/0285707 A1    Sep. 29, 2016

(51) Int. Cl.
H04L 12/26 (2006.01)
H04L 29/08 (2006.01)
G06F 3/0484 (2013.01)
G06F 3/0485 (2013.01)

(52) U.S. Cl.
CPC ........ H04L 43/045 (2013.01); G06F 3/04842 (2013.01); G06F 3/04847 (2013.01); G06F 3/04855 (2013.01); H04L 67/1097 (2013.01); H04L 67/22 (2013.01)

(58) Field of Classification Search
CPC .................................................. H04L 43/045
See application file for complete search history.

(56) References Cited

U.S. PATENT DOCUMENTS

| | | |
|---|---|---|
| 5,459,857 A | 10/1995 | Ludlam et al. |
| 5,511,190 A | 4/1996 | Sharma et al. |
| 5,937,425 A | 8/1999 | Ban |
| 5,991,862 A | 11/1999 | Ruane |

(Continued)

FOREIGN PATENT DOCUMENTS

| | | |
|---|---|---|
| EP | 0726521 A2 | 8/1996 |
| EP | 1970821 A1 | 9/2008 |

(Continued)

OTHER PUBLICATIONS

Agrawal, et al., "Design Tradeoffs for SSD Performance," USENIX Annual Technical Conference, 2008, 14 Pages.

(Continued)

*Primary Examiner* — Jimmy H Tran
(74) *Attorney, Agent, or Firm* — Cesari and McKenna, LLP

(57) ABSTRACT

A system management tool provides a comprehensive summary of operational information of a storage system. For example, the system management tool presents a digital dashboard ("dashboard") in a graphical user interface. The system management tool also presents, via the dashboard, views that correspond to different dimensions of the storage system. In response to expansion of a selected view, the system management tool can automatically collapse the other views into a non-expanded views or move the other views to visible areas remaining after expansion of the selected view. Thus, all of the views remain continuously visible via the dashboard despite the modification to the appearance of the selected view.

19 Claims, 14 Drawing Sheets

(56) References Cited

U.S. PATENT DOCUMENTS

| | | | |
|---|---|---|---|
| 6,219,800 B1 | 4/2001 | Johnson et al. |
| 6,257,756 B1 | 7/2001 | Zarubinsky et al. |
| 6,275,898 B1 | 8/2001 | DeKoning |
| 6,347,337 B1 | 2/2002 | Shah et al. |
| 6,434,662 B1 | 8/2002 | Greene et al. |
| 6,526,478 B1 | 2/2003 | Kirby |
| 6,560,196 B1 | 5/2003 | Wei |
| 6,578,158 B1 | 6/2003 | Deitz et al. |
| 6,604,155 B1 | 8/2003 | Chong, Jr. |
| 6,609,176 B1 | 8/2003 | Mizuno |
| 6,704,839 B2 | 3/2004 | Butterworth et al. |
| 6,741,698 B1 | 5/2004 | Jensen |
| 6,779,003 B1 | 8/2004 | Midgley et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,928,526 B1 | 8/2005 | Zhu et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | Van Rietschote |
| 7,110,913 B2 | 9/2006 | Monroe et al. |
| 7,174,379 B2 | 2/2007 | Agarwal et al. |
| 7,188,149 B2 | 3/2007 | Kishimoto et al. |
| 7,191,357 B2 | 3/2007 | Holland et al. |
| 7,249,150 B1 | 7/2007 | Watanabe et al. |
| 7,251,663 B1 | 7/2007 | Smith |
| 7,257,690 B1 | 8/2007 | Baird |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,457,864 B2 | 11/2008 | Chambliss et al. |
| 7,464,125 B1 | 12/2008 | Orszag et al. |
| 7,526,685 B2 * | 4/2009 | Noy ................... G06F 11/3438 |
| | | 702/186 |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan, IV et al. |
| 7,562,203 B2 | 7/2009 | Scott et al. |
| 7,603,391 B1 | 10/2009 | Federwisch et al. |
| 7,603,529 B1 | 10/2009 | MacHardy et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,701,948 B2 | 4/2010 | Rabie et al. |
| 7,739,614 B1 * | 6/2010 | Hackworth ......... G06F 11/3495 |
| | | 715/771 |
| 7,743,035 B2 | 6/2010 | Chen et al. |
| 7,757,056 B1 | 7/2010 | Fair |
| 7,797,279 B1 | 9/2010 | Starling et al. |
| 7,814,064 B2 | 10/2010 | Vingralek |
| 7,818,525 B1 | 10/2010 | Frost et al. |
| 7,831,769 B1 | 11/2010 | Wen et al. |
| 7,849,098 B1 | 12/2010 | Scales et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,921,325 B2 | 4/2011 | Kondo et al. |
| 7,949,693 B1 | 5/2011 | Mason et al. |
| 7,987,167 B1 | 7/2011 | Kazar et al. |
| 7,996,636 B1 | 8/2011 | Prakash et al. |
| 8,060,797 B2 | 11/2011 | Hida et al. |
| 8,074,019 B2 | 12/2011 | Gupta et al. |
| 8,078,918 B2 | 12/2011 | Diggs et al. |
| 8,082,390 B1 | 12/2011 | Fan et al. |
| 8,086,585 B1 | 12/2011 | Brashers et al. |
| 8,089,969 B2 | 1/2012 | Rabie et al. |
| 8,099,396 B1 | 1/2012 | Novick et al. |
| 8,099,554 B1 | 1/2012 | Solomon et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,145,838 B1 | 3/2012 | Miller et al. |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,225,135 B2 * | 7/2012 | Barrall ................ G06F 11/0727 |
| | | 714/42 |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,489,811 B1 | 7/2013 | Corbett et al. |
| 8,495,417 B2 | 7/2013 | Jernigan, IV et al. |
| 8,520,855 B1 | 8/2013 | Kohno et al. |
| 8,539,008 B2 | 9/2013 | Faith et al. |
| 8,560,879 B1 | 10/2013 | Goel |
| 8,566,617 B1 | 10/2013 | Clifford |
| 8,583,865 B1 | 11/2013 | Sade et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,701 B1 | 4/2014 | Stefanov et al. |
| 8,732,426 B2 | 5/2014 | Colgrove et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,705 B2 | 8/2014 | Hallak et al. |
| 8,806,115 B1 | 8/2014 | Patel et al. |
| 8,806,160 B2 | 8/2014 | Colgrove et al. |
| 8,824,686 B1 | 9/2014 | Ishii et al. |
| 8,832,363 B1 | 9/2014 | Sundaram et al. |
| 8,832,373 B2 | 9/2014 | Colgrove et al. |
| 8,839,008 B2 | 9/2014 | Maniktala |
| 8,850,108 B1 | 9/2014 | Hayes et al. |
| 8,855,318 B1 | 10/2014 | Patnala et al. |
| 8,856,593 B2 | 10/2014 | Eckhardt et al. |
| 8,874,842 B1 | 10/2014 | Kimmel et al. |
| 8,880,787 B1 | 11/2014 | Kimmel et al. |
| 8,892,818 B1 | 11/2014 | Zheng et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,037,544 B1 | 5/2015 | Zheng et al. |

(56) References Cited

U.S. PATENT DOCUMENTS

| | | |
|---|---|---|
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,195,939 B1 | 11/2015 | Goyal et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,286,413 B1 * | 3/2016 | Coates .............. G06F 17/30572 |
| 9,298,417 B1 | 3/2016 | Muddu et al. |
| 9,367,241 B2 | 6/2016 | Sundaram et al. |
| 9,389,958 B2 | 7/2016 | Sundaram et al. |
| 9,405,783 B2 | 8/2016 | Kimmel et al. |
| 9,459,856 B2 | 10/2016 | Curzi et al. |
| 9,471,680 B2 | 10/2016 | Elsner et al. |
| 2002/0073068 A1 | 6/2002 | Guha |
| 2002/0073354 A1 | 6/2002 | Schroiff et al. |
| 2002/0091897 A1 | 7/2002 | Chiu et al. |
| 2002/0156891 A1 | 10/2002 | Ulrich et al. |
| 2002/0174419 A1 | 11/2002 | Alvarez et al. |
| 2002/0175938 A1 * | 11/2002 | Hackworth ............. H04L 67/42 |
| | | 715/751 |
| 2002/0188711 A1 | 12/2002 | Meyer et al. |
| 2003/0005147 A1 | 1/2003 | Enns et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0145041 A1 * | 7/2003 | Dunham ............... G06F 11/328 |
| | | 709/203 |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0215792 A1 | 10/2004 | Koning et al. |
| 2004/0236846 A1 | 11/2004 | Alvarez et al. |
| 2005/0027817 A1 | 2/2005 | Novik et al. |
| 2005/0043834 A1 | 2/2005 | Rotariu et al. |
| 2005/0076113 A1 | 4/2005 | Klotz et al. |
| 2005/0076115 A1 | 4/2005 | Andrews et al. |
| 2005/0091261 A1 | 4/2005 | Wu et al. |
| 2005/0128951 A1 | 6/2005 | Chawla et al. |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0246362 A1 | 11/2005 | Borland |
| 2005/0246398 A1 | 11/2005 | Barzilai et al. |
| 2006/0004957 A1 | 1/2006 | Hand, III |
| 2006/0071845 A1 | 4/2006 | Stroili et al. |
| 2006/0072555 A1 | 4/2006 | St. Hilaire et al. |
| 2006/0072593 A1 | 4/2006 | Grippo et al. |
| 2006/0074977 A1 | 4/2006 | Kothuri et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0282662 A1 | 12/2006 | Whitcomb |
| 2006/0288151 A1 | 12/2006 | McKenney |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0094452 A1 | 4/2007 | Fachan |
| 2007/0112723 A1 | 5/2007 | Alvarez et al. |
| 2007/0136269 A1 | 6/2007 | Yamakabe et al. |
| 2007/0143359 A1 | 6/2007 | Uppala et al. |
| 2007/0186066 A1 | 8/2007 | Desai et al. |
| 2007/0186127 A1 | 8/2007 | Desai et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0266037 A1 | 11/2007 | Terry et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0165899 A1 | 7/2008 | Rahman et al. |
| 2008/0201535 A1 | 8/2008 | Hara |
| 2008/0244158 A1 | 10/2008 | Funatsu et al. |
| 2008/0250270 A1 | 10/2008 | Bennett |
| 2008/0270820 A1 | 10/2008 | Kondo et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0083478 A1 | 3/2009 | Kunimatsu et al. |
| 2009/0097654 A1 | 4/2009 | Blake |
| 2009/0132770 A1 | 5/2009 | Lin |
| 2009/0144497 A1 | 6/2009 | Withers |
| 2009/0150537 A1 | 6/2009 | Fanson |
| 2009/0157870 A1 | 6/2009 | Nakadai |
| 2009/0210611 A1 | 8/2009 | Mizushima |
| 2009/0225657 A1 | 9/2009 | Haggar et al. |
| 2009/0271412 A1 | 10/2009 | Lacapra et al. |
| 2009/0276567 A1 | 11/2009 | Burkey |
| 2009/0276771 A1 * | 11/2009 | Nickolov ............. G06F 9/4856 |
| | | 717/177 |
| 2009/0285476 A1 | 11/2009 | Choe et al. |
| 2009/0313503 A1 | 12/2009 | Atluri et al. |
| 2010/0011037 A1 | 1/2010 | Kazar |
| 2010/0023726 A1 | 1/2010 | Aviles |
| 2010/0030981 A1 | 2/2010 | Cook |
| 2010/0031315 A1 | 2/2010 | Feng et al. |
| 2010/0042790 A1 | 2/2010 | Mondal et al. |
| 2010/0057792 A1 | 3/2010 | Ylonen |
| 2010/0077380 A1 | 3/2010 | Baker et al. |
| 2010/0082648 A1 | 4/2010 | Potapov et al. |
| 2010/0082790 A1 * | 4/2010 | Hussaini ............. H04L 41/0273 |
| | | 709/223 |
| 2010/0088296 A1 | 4/2010 | Periyagaram et al. |
| 2010/0122148 A1 | 5/2010 | Flynn et al. |
| 2010/0161850 A1 | 6/2010 | Otsuka |
| 2010/0169415 A1 | 7/2010 | Leggette et al. |
| 2010/0174714 A1 | 7/2010 | Asmundsson et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2011/0022778 A1 | 1/2011 | Schibilla et al. |
| 2011/0035548 A1 | 2/2011 | Kimmel et al. |
| 2011/0060876 A1 | 3/2011 | Liu |
| 2011/0066808 A1 | 3/2011 | Flynn et al. |
| 2011/0072008 A1 | 3/2011 | Mandal et al. |
| 2011/0078496 A1 | 3/2011 | Jeddeloh |

(56) References Cited

U.S. PATENT DOCUMENTS

| | | |
|---|---|---|
| 2011/0087929 A1 | 4/2011 | Koshiyama |
| 2011/0093674 A1 | 4/2011 | Frame et al. |
| 2011/0099342 A1 | 4/2011 | Ozdemir |
| 2011/0099419 A1 | 4/2011 | Lucas et al. |
| 2011/0126045 A1 | 5/2011 | Bennett |
| 2011/0153719 A1 | 6/2011 | Santoro et al. |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0191389 A1 | 8/2011 | Okamoto |
| 2011/0191522 A1 | 8/2011 | Condict et al. |
| 2011/0213928 A1 | 9/2011 | Grube et al. |
| 2011/0219106 A1 | 9/2011 | Wright |
| 2011/0238857 A1 | 9/2011 | Certain et al. |
| 2011/0246821 A1 | 10/2011 | Eleftheriou et al. |
| 2011/0283048 A1 | 11/2011 | Feldman et al. |
| 2011/0289565 A1 | 11/2011 | Resch et al. |
| 2011/0296133 A1 | 12/2011 | Flynn et al. |
| 2011/0307530 A1 | 12/2011 | Patterson |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0063306 A1 | 3/2012 | Sultan et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0221828 A1 | 8/2012 | Fang et al. |
| 2012/0239869 A1 | 9/2012 | Chiueh et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2013/0007097 A1 | 1/2013 | Sambe et al. |
| 2013/0010966 A1 | 1/2013 | Li et al. |
| 2013/0013654 A1 | 1/2013 | Lacapra et al. |
| 2013/0018854 A1 | 1/2013 | Condict |
| 2013/0019057 A1 | 1/2013 | Stephens |
| 2013/0042065 A1 | 2/2013 | Kasten et al. |
| 2013/0060992 A1 | 3/2013 | Cho et al. |
| 2013/0061169 A1* | 3/2013 | Pearcy .................. G06F 21/552 715/788 |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0083639 A1* | 4/2013 | Wharton ................ G11B 27/36 369/53.1 |
| 2013/0086006 A1 | 4/2013 | Colgrove et al. |
| 2013/0086270 A1 | 4/2013 | Nishikawa et al. |
| 2013/0110783 A1 | 5/2013 | Wertheimer et al. |
| 2013/0110845 A1 | 5/2013 | Dua |
| 2013/0111374 A1* | 5/2013 | Hamilton ................ H04L 41/22 715/763 |
| 2013/0124776 A1 | 5/2013 | Hallak et al. |
| 2013/0138616 A1 | 5/2013 | Gupta et al. |
| 2013/0138862 A1 | 5/2013 | Motwani et al. |
| 2013/0159512 A1* | 6/2013 | Groves ............... H04L 43/0817 709/224 |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185719 A1 | 7/2013 | Kar et al. |
| 2013/0219048 A1 | 8/2013 | Arvidsson et al. |
| 2013/0226877 A1 | 8/2013 | Nagai et al. |
| 2013/0227111 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232240 A1* | 9/2013 | Purusothaman ...... H04L 43/045 709/220 |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290263 A1 | 10/2013 | Beaverson et al. |
| 2013/0305002 A1 | 11/2013 | Hallak et al. |
| 2013/0311740 A1 | 11/2013 | Watanabe et al. |
| 2013/0332688 A1 | 12/2013 | Corbett et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0052764 A1 | 2/2014 | Michael et al. |
| 2014/0068184 A1 | 3/2014 | Edwards et al. |
| 2014/0082255 A1 | 3/2014 | Powell |
| 2014/0082273 A1 | 3/2014 | Segev |
| 2014/0089683 A1 | 3/2014 | Miller et al. |
| 2014/0095758 A1 | 4/2014 | Smith et al. |
| 2014/0101115 A1 | 4/2014 | Ko et al. |
| 2014/0101298 A1* | 4/2014 | Shukla ................ H04L 41/5006 709/223 |
| 2014/0108350 A1 | 4/2014 | Marsden |
| 2014/0108797 A1 | 4/2014 | Johnson et al. |
| 2014/0149647 A1 | 5/2014 | Guo et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195480 A1 | 7/2014 | Talagala et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215170 A1 | 7/2014 | Scarpino et al. |
| 2014/0244962 A1 | 8/2014 | Arges et al. |
| 2014/0258681 A1 | 9/2014 | Prasky et al. |
| 2014/0279917 A1 | 9/2014 | Minh et al. |
| 2014/0279931 A1 | 9/2014 | Gupta et al. |
| 2014/0281055 A1 | 9/2014 | Davda et al. |
| 2014/0297980 A1 | 10/2014 | Yamazaki |
| 2014/0310231 A1 | 10/2014 | Sampathkumaran et al. |
| 2014/0310373 A1 | 10/2014 | Aviles et al. |
| 2014/0325117 A1 | 10/2014 | Canepa et al. |
| 2014/0325147 A1 | 10/2014 | Nayak |
| 2014/0344222 A1 | 11/2014 | Morris et al. |
| 2014/0379965 A1 | 12/2014 | Gole et al. |
| 2015/0019792 A1 | 1/2015 | Swanson et al. |
| 2015/0032928 A1 | 1/2015 | Andrews et al. |
| 2015/0039745 A1* | 2/2015 | Degioanni ............ H04L 43/045 709/224 |
| 2015/0040052 A1* | 2/2015 | Noel .................... G06F 3/04847 715/771 |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |

(56) References Cited

U.S. PATENT DOCUMENTS

| | | |
|---|---|---|
| 2015/0120754 A1 | 4/2015 | Chase et al. |
| 2015/0127922 A1 | 5/2015 | Camp et al. |
| 2015/0134926 A1 | 5/2015 | Yang et al. |
| 2015/0143164 A1 | 5/2015 | Veerla et al. |
| 2015/0169414 A1 | 6/2015 | Lalsangi et al. |
| 2015/0172111 A1 | 6/2015 | Lalsangi et al. |
| 2015/0193338 A1 | 7/2015 | Sundaram et al. |
| 2015/0205663 A1 | 7/2015 | Sundaram et al. |
| 2015/0220402 A1 | 8/2015 | Cantwell et al. |
| 2015/0242478 A1 | 8/2015 | Cantwell et al. |
| 2015/0244795 A1 | 8/2015 | Cantwell et al. |
| 2015/0261446 A1 | 9/2015 | Lee |
| 2015/0286438 A1 | 10/2015 | Simionescu et al. |
| 2015/0324264 A1 | 11/2015 | Chinnakkonda et al. |
| 2015/0339194 A1 | 11/2015 | Kalos et al. |
| 2015/0355985 A1 | 12/2015 | Holtz et al. |
| 2015/0378613 A1 | 12/2015 | Koseki |
| 2016/0026552 A1* | 1/2016 | Holden ............ G06F 8/65 709/224 |
| 2016/0070480 A1 | 3/2016 | Babu et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0099844 A1* | 4/2016 | Colgrove ............ G06F 3/0484 715/736 |
| 2016/0139838 A1 | 5/2016 | D'Sa et al. |
| 2016/0149763 A1* | 5/2016 | Ingram ............ H04L 43/14 709/224 |
| 2016/0149766 A1* | 5/2016 | Borowiec ............ G06F 3/0481 715/735 |
| 2016/0179410 A1 | 6/2016 | Haas et al. |
| 2016/0188370 A1* | 6/2016 | Razin ............ G06F 11/30 718/104 |
| 2016/0248583 A1 | 8/2016 | McClanahan et al. |

FOREIGN PATENT DOCUMENTS

| | | |
|---|---|---|
| EP | 2693358 A1 | 2/2014 |
| EP | 2735978 A1 | 5/2014 |
| WO | WO-2006050455 A2 | 5/2006 |
| WO | WO-2012132943 A1 | 10/2012 |

OTHER PUBLICATIONS

Alvaraez C., "NetApp Deduplication for FAS and V-Series Deployment and Implementation Guide," Technical Report TR-3505, 2011, 71 pages.

Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.

Arpaci-Dusseau R., et al., "Log-Structured File Systems," Operating Systems: Three Easy Pieces published by Arpaci-Dusseau Books, May 25, 2014, 15 pages.

Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.

Ben-Yehuda et al., "The Price of Safety: Evaluating IOMMU Performance," Proceedings of the Linux Symposium, vol. 1, Jun. 27-30, 2007, pp. 9-20.

Bitton D. et al., "Duplicate Record Elimination in Large Data Files," Oct. 26, 1999, 11 pages.

Bogaerdt, "cdeftutorial," http://oss.oetiker.ch/rrdtool/tut/cdeftutorial.en.html Date obtained from the internet, Sep. 9, 2014, 14 pages.

Bogaerdt, "Rates, Normalizing and Consolidating," http://www.vandenbogaerdl.nl/rrdtool/process.php Date obtained from the internet: Sep. 9, 2014, 5 pages.

Bogaerdt, "rrdtutorial," http://oss.oetiker.ch/rrdtool/lul/rrdtutorial.en.html Date obtained from the internet, Sep. 9, 2014, 21 pages.

Cornwell, M., "Anatomy of a Solid-state Drive," ACM Queue-Networks, Oct. 2012, vol. 10 (10), pp. 1-7.

Culik K., et al., "Dense Multiway Trees," ACM Transactions on Database Systems, Sep. 1981, vol. 6 (3), pp. 486-512.

Debnath B., et al., "FlashStore: High Throughput Persistent Key-Value Store," Proceedings of the VLDB Endowment VLDB Endowment, Sep. 2010, vol. 3 (1-2), pp. 1414-1425.

Debnath, et al., "ChunkStash: Speeding up in line Storage Deduplication using Flash Memory," USENIX, USENIXATC '10, Jun. 2010, 15 pages.

Fan, et al., "MemC3: Compact and Concurrent MemCache with Dumber Caching and Smarter Hashing," USENIX NSDI '13, Apr. 2013, pp. 371-384.

Final Office Action mailed Dec. 2, 2015, for U.S. Appl. No. 14/684,956, filed Apr. 13, 2015, 12 pages.

Final Office Action mailed Dec. 22, 2015, for U.S. Appl. No. 13/857,008, filed Apr. 4, 2013, 10 pages.

Final Office Action mailed Dec. 4, 2013, for U.S. Appl. No. 13/856,997 filed Apr. 4, 2013, 25 pages.

Final Office Action mailed Dec. 4, 2015, for U.S. Appl. No. 14/454,197 filed Aug. 7, 2014, 11 pages.

Final Office Action mailed Feb. 16, 2016, for U.S. Appl. No. 14/186,847, filed Feb. 21, 2014, 25 pages.

Final Office Action mailed Feb. 2, 2016, for U.S. Appl. No. 13/856,958, filed Apr. 4, 2013, 18 pages.

Final Office Action mailed Feb. 6, 2014, for U.S. Appl. No. 13/856,958, filed Apr. 4, 2013, 16 pages.

Final Office Action mailed Mar. 2, 2016 for U.S. Appl. No. 14/701,832, filed May 1, 2015, 16 pages.

Final Office Action mailed May 13, 2013, for U.S. Appl. No. 13/041,122, filed Mar. 4, 2011, 22 pages.

Final Office Action mailed Nov. 25. 2015, for U.S. Appl. No. 14/684,966, filed Apr. 13, 2015, 21 pages.

Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.

Gray J., et al., "Flash Disk Opportunity for Server Applications," Queue—Enterprise Flash Storage, Jul.-Aug. 2008, vol. 6 (4), pp. 18-23.

Gulati et al., "BASIL: Automated IO Load Balancing Across Storage Devices," Proceedings of the 8th USENIX Conference on File and Storage Technologies, Fast'10, Berkeley, CA, USA, 2010, 14 pages.

Handy J., "SSSI Tech Notes: How Controllers Maximize SSD Life," SNIA, Jan. 2013, pp. 1-20.

Hwang K., et al., "RAID-x: A New Distributed Disk Array for I/O-centric Cluster Computing," IEEE High-Performance Distributed Computing, Aug. 2000, pp. 279-286.

Intel, Product Specification—Intel® Solid-State Drive DC S3700, Jun. 2013, 32 pages.

International Search Report and Written Opinion for Application No. PCT/EP2014/071446 mailed on Apr. 1, 2015, 14 pages.

International Search Report and Written Opinion for Application No. PCT/US2012/071844 mailed Mar. 1, 2013, 12 pages.

International Search Report and Written Opinion for Application No. PCT/US2014/035284 mailed on Apr. 1, 2015, 8 pages.

International Search Report and Written Opinion for Application No. PCT/US2014/055138 mailed on Dec. 12, 2014, 13 pages.

International Search Report and Written Opinion for Application No. PCT/US2014/058728 mailed on Dec. 16, 2014, 11 pages.

International Search Report and Written Opinion for Application No. PCT/US2014/060031 mailed on Jan. 26, 2015, 9 pages.

International Search Report and Written Opinion for Application No. PCT/US2014/071446 mailed on Apr. 1, 2015, 13 pages.

International Search Report and Written Opinion for Application No. PCT/US2014/071465 mailed on Mar. 25, 2015, 12 pages.

International Search Report and Written Opinion for Application No. PCT/US2014/071484 mailed on Mar. 25, 2015, 9 pages.

International Search Report and Written Opinion for Application No. PCT/US2014/071581 mailed on Apr. 10, 2015, 9 pages.

(56) References Cited

OTHER PUBLICATIONS

International Search Report and Written Opinion for Application No. PCT/US2014/071635 mailed on Mar. 31, 2015, 13 pages.
International Search Report and Written Opinion for Application No. PCT/US2015/016625 mailed on Sep. 17, 2015, 8 pages.
International Search Report and Written Opinion for Application No. PCT/US2015/021285 mailed Jun. 23, 2015, 8 pages.
International Search Report and Written Opinion for Application No. PCT/US2015/024067 mailed Jul. 8, 2015, 7 pages.
International Search Report and Written Opinion for Application No. PCT/US2015/048800 mailed on Nov. 25, 2015, 11 pages.
International Search Report and Written Opinion for Application No. PCT/US2015/048833 mailed on Nov. 25, 2015, 11 pages.
International Search Report and Written Opinion for Application No. PCT/US2015/056932 mailed on Jan. 21, 2016, 11 pages.
International Search Report and Written Opinion for Application No. PCT/US2015/057532 mailed on Feb. 9, 2016, 12 pages.
Kagel A.S, "two-way merge sort," Dictionary of Algorithms and Data Structures [online], retrieved on Jan. 28, 2015, Retrieved from the Internet :< URL: http://xlinux.nist.gov/dads/HTMUIwowaymrgsrl.html>, May 2005, 1 page.
Lamport L., "The Part-Time Parliament," ACM Transactions on Computer Systems, May 1998, vol. 16 (2), pp. 133-169.
Leventhal A.H., "A File System All its Own," Communications of the ACM Queue, May 2013, vol. 56 (5), pp. 64-67.
Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Moshayedi M., et al., "Enterprise SSDs," ACM Queue—Enterprise Flash Storage, Jul.-Aug. 2008, vol. 6 (4), pp. 32-39.
Non-Final Office Action mailed Aug. 12, 2015, for U.S. Appl. No. 14/684,929, filed on Apr. 13, 2015, 20 pages.
Non-Final Office Action mailed Aug. 13, 2015, for U.S. Appl. No. 13/856,958, filed Apr. 4, 2013, 15 pages.
Non-Final Office Action mailed Aug. 13, 2015, for U.S. Appl. No. 14/186,847, filed on Feb. 21, 2014, 20 pages.
Non-Final Office Action mailed Aug. 21, 2013, for U.S. Appl. No. 13/856,997, filed Apr. 4, 2013, 19 pages.
Non-Final Office Action mailed Aug. 7, 2015, for U.S. Appl. No. 14/684,894, filed on Apr. 13, 2015, 10 pages.
Non-Final Office Action mailed Dec. 5, 2012, for U.S. Appl. No. 13/041,122, filed Mar. 4, 2011, 21 pages.
Non-Final Office Action mailed Jan. 29, 2016, for U.S. Appl. No. 14/454,197, filed Aug. 7, 2014, 11 pages.
Non-Final Office Action mailed Jul. 1, 2015, for U.S. Appl. No. 13/857,008, filed Apr. 4, 2013, 10 pages.
Non-Final Office Action mailed Jul. 14, 2015, for U.S. Appl. No. 14/454,197, filed Aug. 7, 2014, 5 pages.
Non-Final Office Action mailed Jul. 14, 2015, for U.S. Appl. No. 14/684,956, filed Apr. 13, 2015, 5 pages.
Non-Final Office Action mailed Jul. 14, 2015, for U.S. Appl. No. 14/684,966, filed Apr. 13, 2015, 21 pages.
Non-Final Office Action mailed Jul. 29, 2015, for U.S. Appl. No. 14/292,089, filed May 30, 2014, 4 pages.
Non-Final Office Action mailed Jul. 31, 2013, for U.S. Appl. No. 13/856,958, filed Apr. 4, 2013, 15 pages.
Non-Final Office Action mailed Jul. 31, 2015 for U.S. Appl. No. 14/259,467, filed on Apr. 23, 2014, 10 pages.
Non-Final Office Action mailed Jul. 31, 2015, for U.S. Appl. No. 14/684,942, filed Apr. 13, 2015, 4 pages.
Non-Final Office Action mailed Jun. 17, 2013, for U.S. Appl. No. 13/041,095, filed Mar. 4, 2011, 10 pages.
Non-Final Office Action mailed Jun. 30, 2015, for U.S. Appl. No. 14/057,145, filed Oct. 18, 2015, 21 pages.
Non-Final Office Action mailed Mar. 31, 2016, for U.S. Appl. No. 14/941,938.
Non-Final Office Action mailed Oct. 19, 2015, for U.S. Appl. No. 14/701,832, filed May 1, 2015, 11 pages.
Non-Final Office Action mailed on Jan. 26, 2016 for U.S. Appl. No. 14/932,063, filed Nov. 4, 2015, 9 pages.
Non-Final Office Action mailed Sep. 10, 2014, for U.S. Appl. No. 13/338,039, filed Dec. 27, 2011, 10 pages.
Notice Allowance mailed Jan. 21, 2016, for U.S. Appl. No. 14/684,894, filed Apr. 13, 2015, 13 pages.
Notice of Allowance mailed Apr. 14, 2015, for U.S. Appl. No. 13/856,997, filed Apr. 4, 2013, 18 pages.
Notice of Allowance mailed Apr. 24, 2014, for U.S. Appl. No. 13/041,122, filed Mar. 4, 2011, 14 pages.
Notice of Allowance mailed Aug. 24, 2016, for U.S. Appl. No. 14/684,956, filed Apr. 13, 2015, 4 pages.
Notice of Allowance mailed Aug. 27, 2015 for U.S. Appl. No. 14/684,914, filed Apr. 13, 2015, 10 pages.
Notice of Allowance mailed Dec. 8, 2014, for U.S. Appl. No. 13/338,039, filed Dec. 27, 2011, 7 pages.
Notice of Allowance mailed Feb. 22, 2016, for U.S. Appl. No. 14/057,145, filed Oct. 18, 2015, 12 pages.
Notice of Allowance mailed Mar. 29, 2016, for U.S. Appl. No. 14/454,197, filed Aug. 7, 2014, 7 pages.
Notice of Allowance mailed May 4, 2016 for U.S. Appl. No. 14/932,063, filed Nov. 4, 2015, 7 pages.
Notice of Allowance mailed Oct. 9, 2013, for U.S. Appl. No. 13/041,095, filed Mar. 4, 2011, 7 pages.
Oetiker, "rrdfetch," http ://oss.oetiker.ch/rrdtool/doc/rrdfetch .en.html, Date obtained from the internet: Sep. 9, 2014, 5 pages.
Oetiker, "rrdtool," http ://loss. oetiker.ch/rrdtool/doc/rrdtool.en. html Date obtained from the internet: Sep. 9, 2014, 5 pages.
O'Neil P., at al., "The Log-structured Merge-tree (lsm-tree)," Acta Informatica, 33, 1996, pp. 351-385.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1), Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The Design and Implementation of a Log-Structured File System,"Proceedings of the 13th ACM Symposium on Operating Systems Principles, (SUN00007382-SUN00007396), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, (SUN00006851-SUN00006866), Jun. 1990, 16 pages.
Rosenblum M., "The Design and Implementation of a Log-Structured File System," UC Berkeley,1992, pp. 1-101.
Sears., et al., "Blsm: A General Purpose Log Structured Merge Tree," Proceedings of the 2012 ACM SIGMOD International Conference on Management, 2012, 12 pages.
Seltzer M., et al., "An Implementation of a Log Structured File System for UNIX," Winter USENIX, San Diego, CA, Jan. 25-29, 1993, pp. 1-18.
Seltzer M.I., et al., "File System Performance and Transaction Support," University of California at Berkeley Dissertation, 1992, 131 pages.
Smith K., "Garbage Collection," Sand Force, Flash Memory Summit, Santa Clara, CA, Aug. 2011, pp. 1-9.

(56) References Cited

OTHER PUBLICATIONS

Supplementary European Search Report for Application No. EP12863372 mailed on Jul. 16, 2015, 7 pages.
Texas Instruments, User Guide, TMS320C674x/OMAP-L1 x Processor Serial ATA (SATA) Controller, Mar. 2011, 76 Pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.
Wu P-L., et al., "A File-System-Aware FTL Design for Flash-Memory Storage Systems," IEEE, Design, Automation & Test in Europe Conference & Exhibition, 2009, pp. 1-6.
Chris K., et al., "How many primes are there?" Nov. 2001. https://web.archive.org/web/20011120073053/http://primes.utm.edu/howmany.shtml.
Metreveli et al. "CPHash: A Cache-Partitioned Hash Table." Nov. 2011. https://people.csail.mit.edu/nickolai/papers/metrevelicphash-tr.pdf.
Stoica et al. "Chord: A Scalable Peer-to-peer Lookup Service for Internet Applications." Aug. 2001. ACM. SIGCOMM '01.

* cited by examiner

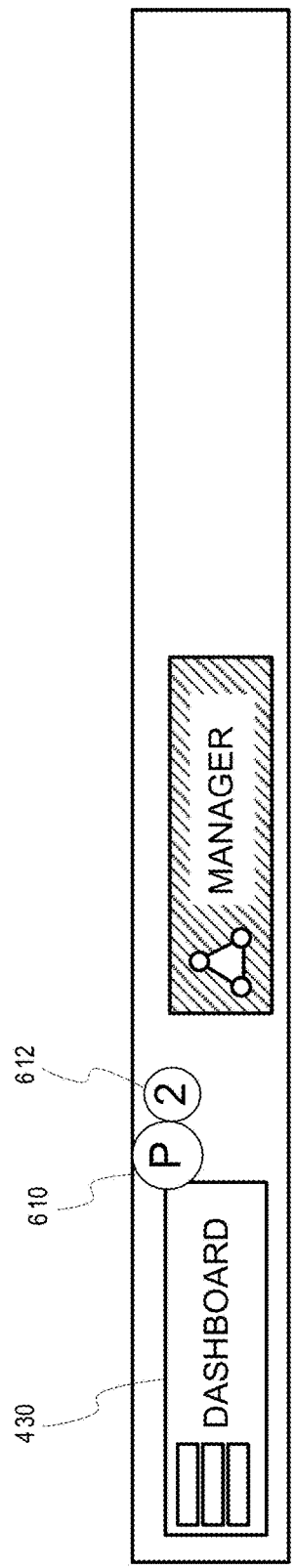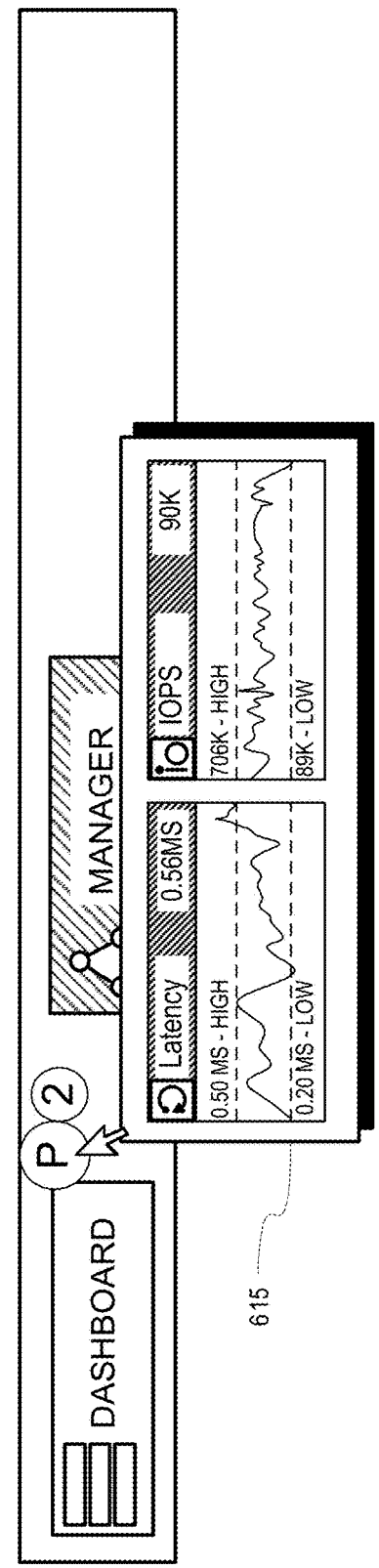

PROVIDING CONTINUOUS CONTEXT FOR OPERATIONAL INFORMATION OF A STORAGE SYSTEM

BACKGROUND

Aspects of the disclosure generally relate to the field of distributed storage systems (hereinafter "storage systems") and, more particularly, to tools for management of a storage system.

Computer users, especially in the businesses world, produce an ever-increasing amount of digital data. Consequently, there is an ever-increasing need to store and access that digital data ("data demand and use") in a way that is efficient and cost effective. Techniques and mechanisms that facilitate efficient and cost effective storage of vast amounts of digital data are, therefore, critical to the success of business entities and consumers.

Some companies, such as NetApp Inc., provide data storage solutions. NetApp Inc. provides storage systems with exceptionally high reliability, availability, and performance. For instance, NetApp Inc. has some solutions that leverage data virtualization and computer clustering to provide unified, flexible, and scalable storage solutions. For example, the NetApp® Data ONTAP® operating system (Data ONTAP) can control a group of data storage devices in a cluster network environment, also referred to as a clustered storage environment or a cluster of storage appliances. A cluster network environment comprises a plurality of nodes (e.g., storage servers, computing devices, etc.) that are connected together in a secure, private network (cluster network). The cluster network permits the networked nodes to communicate information to each other securely and rapidly. The nodes may cooperate together as a single coherent storage system.

However, as reliable as some storage systems can be, sometimes they experience problems and failures. Because of the importance of having an available distributed storage system, the ability to track, and recover from, the problems and failures is relevant to the value of the storage system.

SUMMARY

A system management tool can present a summary, yet comprehensive, view of current operational information for a storage system regardless of scale and complexity of the storage system. A system management tool can continuously determine and present operational information about the storage system. The system management tool can use a digital dashboard that provides timely, relevant, and well organized operational information. The digital dashboard provides an operator (e.g., a system administrator) with information sufficient to effectively manage a storage system. The digital dashboard (hereinafter "dashboard") provides views with different levels of detail for selected/configured categories of operational information for a storage system. With the different levels of views for the categories, the dashboard presents at least some level of operational information across all of the categories in a visible area (e.g., a single web page or defined desktop area). With the system management tool continuously collecting operational information across the categories of operational information, the dashboard continuously provides a comprehensive summary of operational status of the storage system. With a single web page, for example, an operator can determine whether a storage system is functioning within, and/or beyond, its specific operational parameters.

This summary is a brief summary for the disclosure, and not a comprehensive summary. The purpose of this brief summary is to provide a compact explanation as a preview to the disclosure. This brief summary does not capture the entire disclosure, and should not be used to limit claim scope.

BRIEF DESCRIPTION OF THE DRAWINGS

Aspects of the disclosure may be better understood by referencing the accompanying drawings.

FIG. 6A is an example illustration of a system management tool configured to present alerts for critical events of a storage system.

FIG. 6B is an example illustration of a system management tool configured to present alerts and low-level detail for critical events of a storage system.

DETAILED DESCRIPTION OF THE DISCLOSURE

Figure 1:
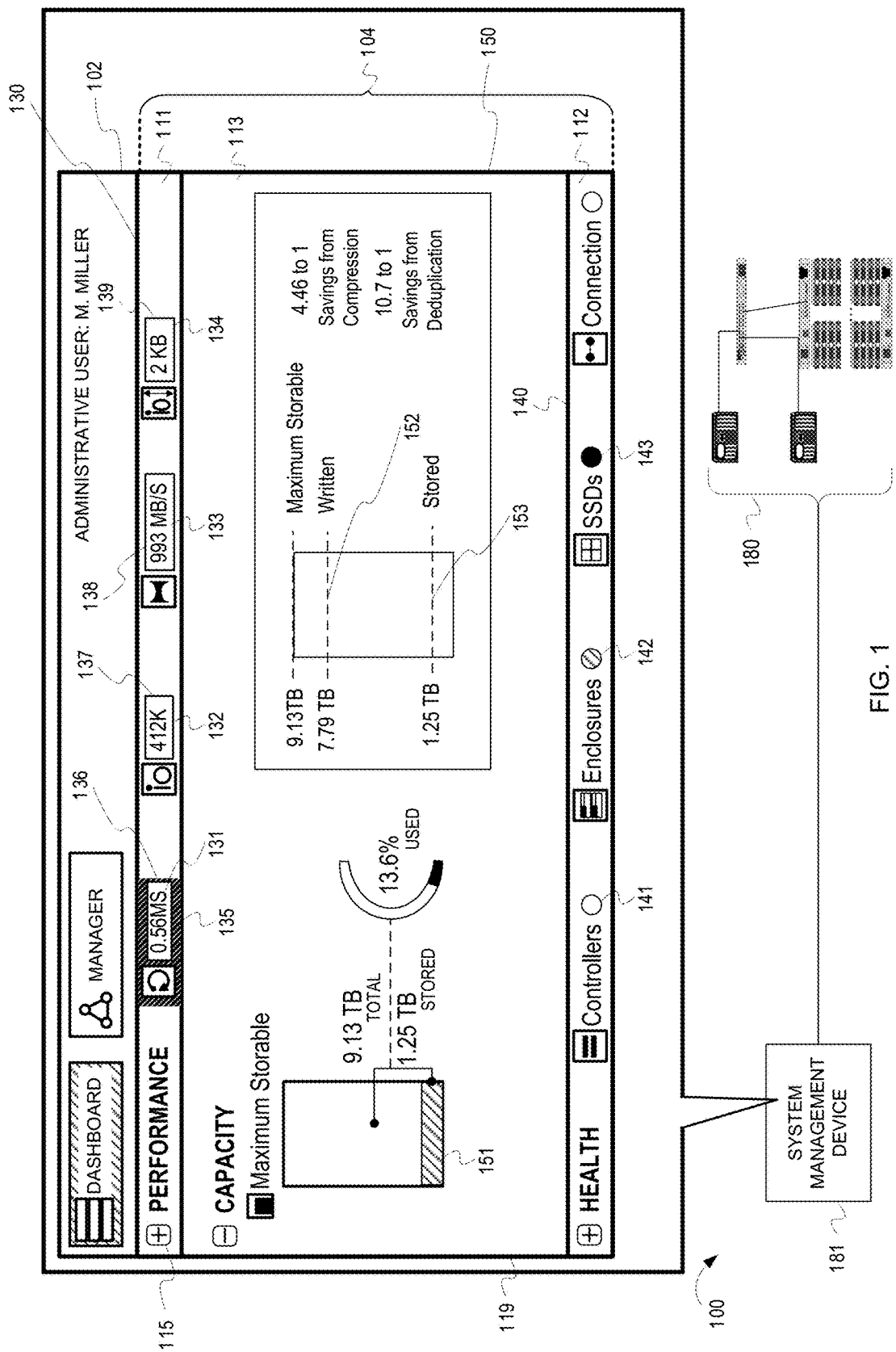
FIG. 1 is an example illustration of a system management tool that presents a comprehensive and compact view of operational information for a storage system.

The description that follows includes example systems, methods, techniques, and program code/instructions that embody techniques of the aspects of the disclosure. However, it is understood that aspects of the disclosure may be practiced without these specific details. For instance, although examples refer to dashboards, some aspects of the disclosure may relate to other forms of system management tools that present indicators of operational information, such as widgets and panels. In other instances, well-known instruction instances, protocols, structures and techniques have not been shown in detail in order not to obfuscate the description.

Terminology

This disclosure refers to "elements" of a storage system. This disclosure refers to elements because of the variety of and complexity of a storage system. The variety and complexity encompasses both hardware elements and software elements. Examples of hardware elements include, but are not limited to, storage controllers, storage controller enclosures, storage drives, storage arrays, storage equipment sensors, storage subsystem devices, network switches, network servers, electrical probes, power supplies, cables, fans, ports, boards, and so forth. Examples of software elements include, but are not limited to, drivers, applications, operating systems, and so forth. The term "element" is also used to refer to an aspect of a hardware element or software element. For instance, a storage system element may be a feature or function of a software element (e.g., deduplication by a storage operating system).

This disclosure also refers to "operational information" for a storage system. Operational information includes measurements, analytics, or any other information that corresponds to a past, current, and/or potential future operational status of any element of a storage system. Operational information can be collected data or can be derived or calculated from collected data. In addition, operational information can correspond to operational parameters or limits of a storage system.

Introduction

Storage systems are designed to provide high reliability, availability, and performance. To meet increasing data demand and use, storage systems have increased in both scale and complexity. A storage system can be comprised of any number of clusters, each of which can include storage arrays, network elements, managing nodes, etc. A problem or failure in any given part of the storage system can negatively affect operation of the storage system. In some instances, the problem or failure can cause a complete shutdown of the storage system. Just as the scale and complexity of storage systems has increased with data demand and use (hereinafter truncated to "data demand"), the operational information for monitoring/managing storage systems has increased. While a system management tool can present operational information, the utility of the presented information is dependent upon what information is collected, how it is collected, and how it is presented. A system management tool can easily overwhelm a user with operational information that does not facilitate monitoring and management of a storage system. Further, a system management tool may not collect operational information in a manner that allows for effective presentation of the operational information.

Overview

A system management tool can present a summary, yet comprehensive, view of current operational information for a storage system regardless of scale and complexity of the storage system. A system management tool can continuously determine and present operational information about the storage system. The system management tool can use a digital dashboard that provides timely, relevant, and well organized operational information. The digital dashboard provides an operator (e.g., a system administrator) with information sufficient to effectively manage a storage system. The digital dashboard (hereinafter "dashboard") provides views with different levels of detail for selected/configured categories of operational information for a storage system. With the different levels of views for the categories, the dashboard presents at least some level of operational information across all of the categories in a visible area (e.g., a single web page or defined desktop area). With the system management tool continuously collecting operational information across the categories, the dashboard continuously provides a comprehensive summary of operational status of the storage system. With a single web page, for example, an operator can determine whether a storage system is functioning within, and/or beyond, its specific operational parameters.

Example Illustrations

FIG. 1 is an example illustration of a system management tool that presents a comprehensive and compact view of operational information for a storage system.

In FIG. 1, a system management device 181 hosts a system management tool 102. The system management tool 102 includes a digital dashboard 104. The digital dashboard ("dashboard") 104 is a single-paged view that presents operational information about elements 180 of a storage system 100.

The operational information is presented via the dashboard 104 corresponding to different dimensions of a storage system or different categories, such as performance, storage capacity ("capacity"), and system health ("health"). The performance category corresponds to a speed at which data is stored on, or accessed from, the elements 180. The capacity category corresponds to an amount of storage available and used. The health category corresponds to operational integrity of elements of the storage system 100.

The dashboard 104 is configured with a layout having sections 130, 140 and 150 assigned to each of the categories. For instance, the operational information for the performance category is specified in a section 130 labeled as "Performance." The operational information for the capacity category is specified in a section 150 labeled as "Capacity." The operational information for the health category is specified in a section 140 labeled as "Health." The layout of the dashboard 104 maintains a presentation of the sections 130, 140 and 150 relative to each other. For instance, the section 130 is vertically above section 150, which is vertically above section 140.

Each of the sections 130, 140, and 150 can present different levels of views (i.e., view of different levels of detail). For example, at any given moment, each of the sections 130, 140, and 150 can present either an expanded view or a non-expanded view.

A non-expanded view (also referred to herein as a minimized view) is a view that presents operational information in a succinct visual form (i.e., less detail). Various techniques can be employed to define a compact area sufficient to present informative operational information without impeding the comprehensive summary offered by the entire dashboard. For instance, a non-expanded view can have a height limited to a size of a default font. In some instances, a non-expanded view can be a single-bar, graphical control element (e.g., a status bar, a toolbar, etc.). In some instances, the non-expanded view can also have limited length. For instance, the non-expanded view may be only a length of only a few text characters. In some instances the text can scroll, as in a ticker, within the limited length. In some instances, a non-expanded view can dynamically adjust in length to approximately equal a length of data presented thereon. In other instances, the length of the non-expanded view may be fixed, such as the length of an entire dimension of the single page of the dashboard 104 (e.g., from a left-hand side edge to a right-hand side edge of the single page or from a bottom edge to a top edge of the single page). Further, the non-expanded view can have an expansion control that will expand the non-expanded view into an expanded view (also referred to herein as a maximized view).

Figure 2:
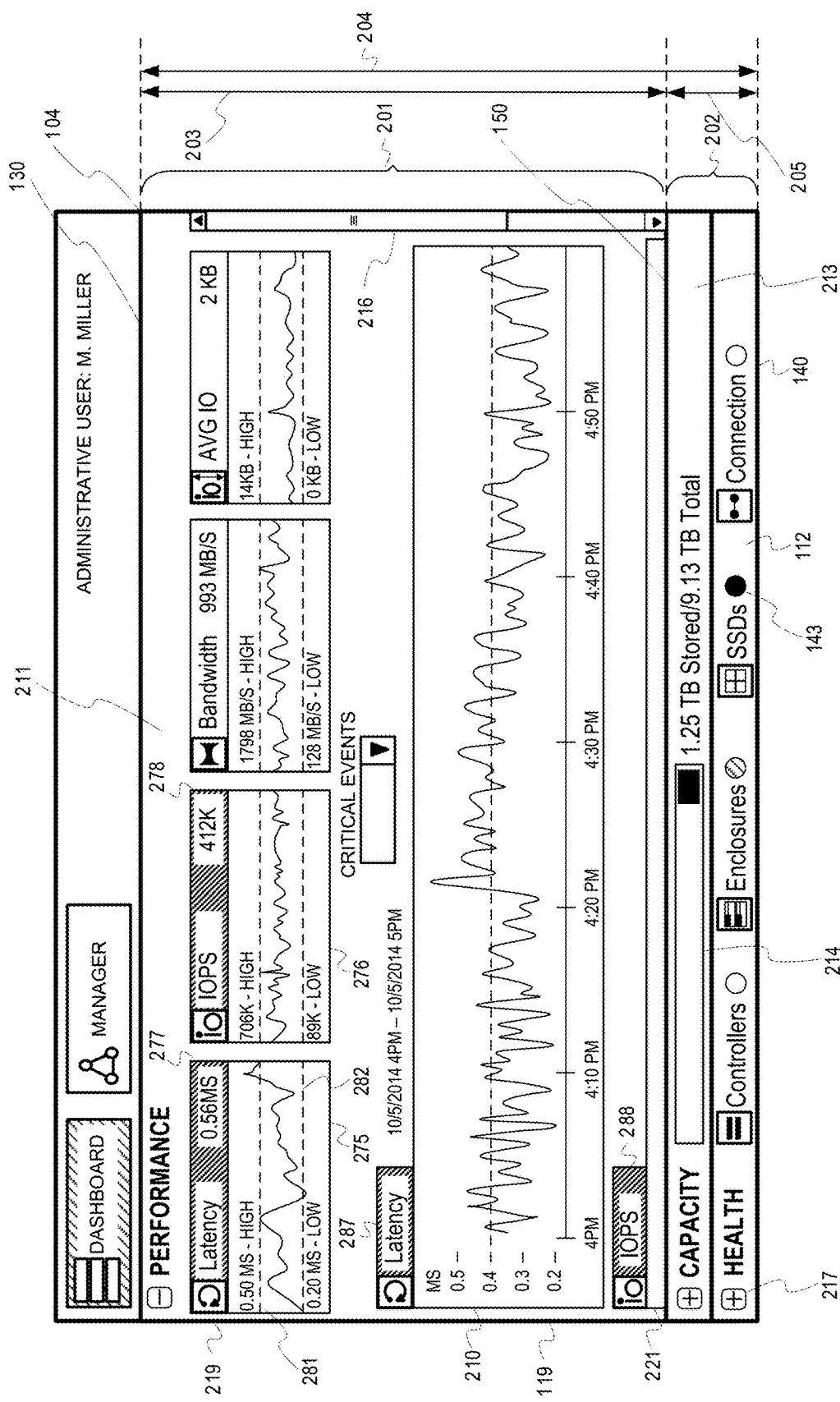
FIG. 2 is an example illustration of a system management tool configured to automatically replace an expanded view with a non-expanded view for continuous context of the operational information of the storage system.
Figure 3:
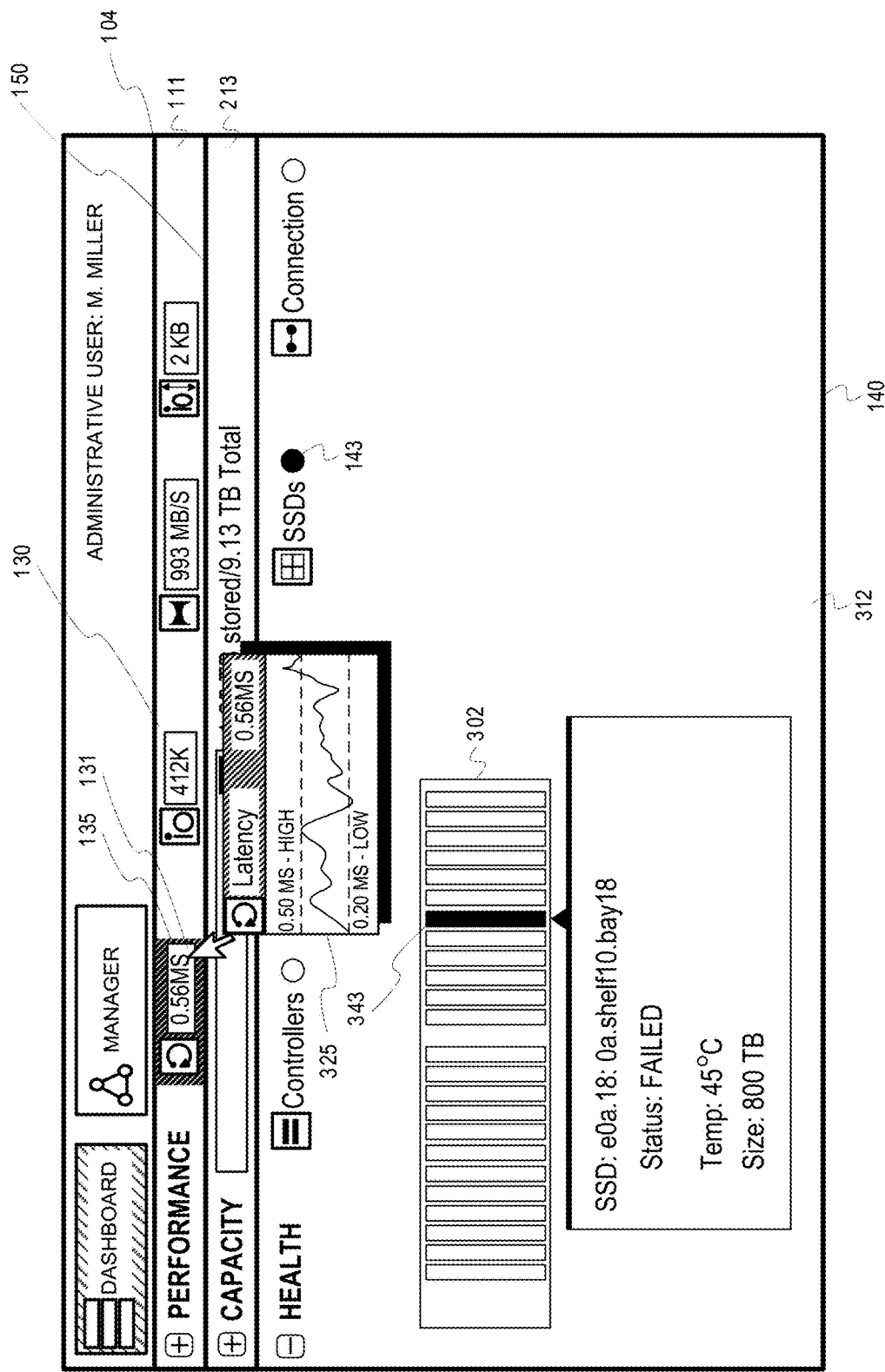
FIG. 3 is an example illustration of a system management tool configured to present indicators of the operational information in a view of a digital dashboard when threshold values are exceeded in a storage system.

The dashboard 104 is configured to permit presentation of one expanded view at a given time. In FIG. 1, the dashboard 104 concurrently presents multiple non-expanded views 111 and 112 and only one expanded view 113. To access more detail for any of the non-expanded views 111 and 112, an administrative user can expand the non-expanded views 111 and 112. FIG. 2 shows an example of what occurs after the non-expanded view 111 is expanded. FIG. 3 shows an example of what occurs after the non-expanded view 112 is expanded. FIGS. 2 and 3 will be described in detail later.

The different levels of detail can vary based on a time dimension for the operational information. For instance, a non-expanded view may present the values of the operational information in a window of time defined as "current" (e.g., last 5 seconds). This minimizes the amount of operational information to be shown in the limited space of a non-expanded view. However, an expanded view is larger, and therefore can present operational information over a time range in graphs, charts, reports, etc.

The dashboard 104 presents the operational information in the views using indicators. Indicators are visible representations of the operational information. An indicator includes a visible form or structure with a value(s) (e.g., a graph of values, a meter, a gauge, a text box, etc.). The value is based on the operational information. Each indicator relates to a specific metric or type of measurement (e.g., "latency," "bandwidth," etc.). As shown in FIG. 1, the non-expanded view 111 includes indicators 136, 137, 138 and 139. The indicator 136 presents a time-based (referred to as "real-time") indicator value 131 for a latency metric. Latency is a time-delay measurement of speed between when a read and/or write operation is initiated and when the read and/or write operation is completed. The indicator 137 presents time-based value 132 for a rate at which some of the elements 180 perform certain operations (i.e., an "input/output operations per second (IOPS)"). The IOPS is a measurement of speed at which data is being read and/or written to a computer storage device (e.g., to a hard disk storage, a solid state storage, a tape, etc.). The indicator 139 presents a time-based value 134 for an "average input/output size (AVG IO)" of data written and/or accessed on the storage system 100. The AVG IO is a measurement of an average size of a request for data for a given time period. The indicator 138 presents a time-based value 133 for a "bandwidth" associated with some of the elements 180. Bandwidth is a measurement defined as the IOPS multiplied by the AVG IO.

The non-expanded view 112 includes graphical indicators that specify operational status of different types of hardware elements of the storage system 100 (e.g., controllers, enclosures, solid-state drives (SSDs), and connections). The graphical indicators on the non-expanded view 112 specify whether a particular hardware type is functional, is experiencing a problem, or is potentially going to experience a problem. For example, the non-expanded view 112 for the health category can show graphical indicators with different colors, symbols, shading, etc., that indicate operational integrity of hardware. For instance, graphical indicator 141 may be a green color, which indicates that all of the controllers for the storage system 100 are functioning properly. Graphical indicator 142 may be a yellow color, which indicates that at least one enclosure in the storage system 100 has a potential to malfunction. Graphical indicator 143 may be a red color, which indicates that at least one SSD has malfunctioned. The non-expanded view 112 can show a degree or history of a warning to indicate a possible severity of the warning (e.g., a glowing graphic that increases in size and intensity the longer the warning exists, a numerical indicator that indicates a severity level, etc.). In some examples, the system management tool 102 can indicate a possible failure of a hardware component based on a history of operational information for the hardware component. For example, the system management tool can analyze (or access analytics for) a number of previous errors for a hardware component, a degree of performance degredation for a hardware component, and a rising temperature trend of a hardware component. The system management tool 102 can predict the possible failure based on the analysis. The system management tool 102 can also predict a hardware failure based on a chain reaction in the system. For example, the system management tool 102 can determine that a failure of a housing component may lead to a failure of a component housed within the housing component, and so forth. The system management tool 102 can then present indicators of the possible failures and/or predictions on the dashboard 104, such as on the non-expanded view 112.

The dashboard 104 is further configured to receive user input to "drill down" into any view for more detail about the operational information. The phrase "drill down" is used to describe an action that moves from a less detailed view to a more detailed view. For example, a user may drill down from a non-expanded view (e.g., a status bar view, a miniaturized summary view, etc.) to an expanded view. Drill down operations can also occur in expanded views. For instance, after being expanded from a non-expanded view, an expanded view may present a mid-level of detail. The user may drill down further into the expanded view by interacting with an object on the expanded view. For instance, the user may click on a graph or control element in the expanded view. When the user clicks on the graph or control element, the dashboard initiates another drill down operation to present more detail in the expanded view than was previously presented.

The dashboard 104 presents operational information for all categories, at all given times. The dashboard 104 continuously determines updates to the operational information according to refresh rates that correspond to the categories. The dashboard 104 then refreshes the values on the indicators based on refreshed operational information. By continuously presenting and updating operational information and indicator values, the digital dashboard 104 provides the information that an operator of the storage system 100 would need to diagnose potential problems early and remedy the potential problems before they become actual problems. Because the operational information can be used to identify optimal functionality and problems within the system, the dashboard 104 ensures that all of the most critical operational information, from each category, is continuously kept in view, including when a drill-down operation occurs that changes the appearance of the dashboard 104.

FIGS. 1 and 2 illustrate one example of presenting operational information for all categories at all given times in response to a user input that drills down into one view on the dashboard 104. For instance, when a non-expanded view is expanded (i.e., drilled down on), the dashboard 104 automatically causes any expanded views of the dashboard 104 assigned to other categories to collapse back into non-expanded views for their respective categories. The non-expanded views show indicators for the operational information associated with the category. The dashboard 104 ensures that the non-expanded views remain in view on a visible screen area. By causing the non-expanded views to collapse and remain visible, the dashboard 104 ensures that the operational information for all categories remains continuously in view.

More specifically, in FIG. 1, the system management tool 102 detects a user input with the expansion button 115 for the non-expanded view 111 of the performance category. When the expansion button 115 is selected, the non-expanded view 111 expands, as shown in FIG. 2. In FIG. 2, the dashboard 104 presents, in section 130, an expanded view 211. Concurrently, as shown in FIG. 2, the system management tool 102 replaces the expanded view 113 (for the capacity category) with a non-expanded view 213.

The non-expanded views 111, 112, and 213 shown in FIGS. 1 and 2 are also configured to specify when time based metrics have exceeded a threshold value stored in configuration settings for the storage system 100. For instance, as shown in FIG. 1, the non-expanded view 111 shows an indicator graphic 135 that specifies that the time based indicator value 131 has exceeded a threshold value. For example, the indicator value 131 specifies that the latency metric has exceeded a performance range (e.g., has gone above a 0.50 milli-second (ms) value, or has gone below a 0.20 ms value). The range may have been set manually by an operator, configured by default, or selected based on a particular use of the storage system 100 or based on a user role.

In FIG. 2, after the expanded view 113 is collapsed into the non-expanded view 213, the non-expanded view 213 includes a bar graphic 214 showing a storage capacity limit and amount of storage used for that storage capacity limit. As illustrated in FIG. 2, 1.25 terabytes (TB) are stored out of 9.13 TB of total storage space apportioned for a particular application associated with the administrative user account logged into system management tool 102. For example, the administrative user account may have a certain portion of storage capacity (e.g., 9.13 TB) provisioned from a total amount (e.g., 5000 TB) for the storage system 100. Other aspects of the dashboard 104 may be customized to the administrative user account.

FIG. 3 illustrates an example of the dashboard 104 when the non-expanded view 112 for the health category is expanded. An expansion button 217 in FIG. 2 can be selected to replace the non-expanded view 112 with an expanded view 312 as shown in FIG. 3. The section 140 shows details for a shelf of SSDs. In direct response to presenting the expanded view 312, the system management tool 102 causes the expanded view 211 for the section 130 to collapse back to the non-expanded view 111.

Figure 4:
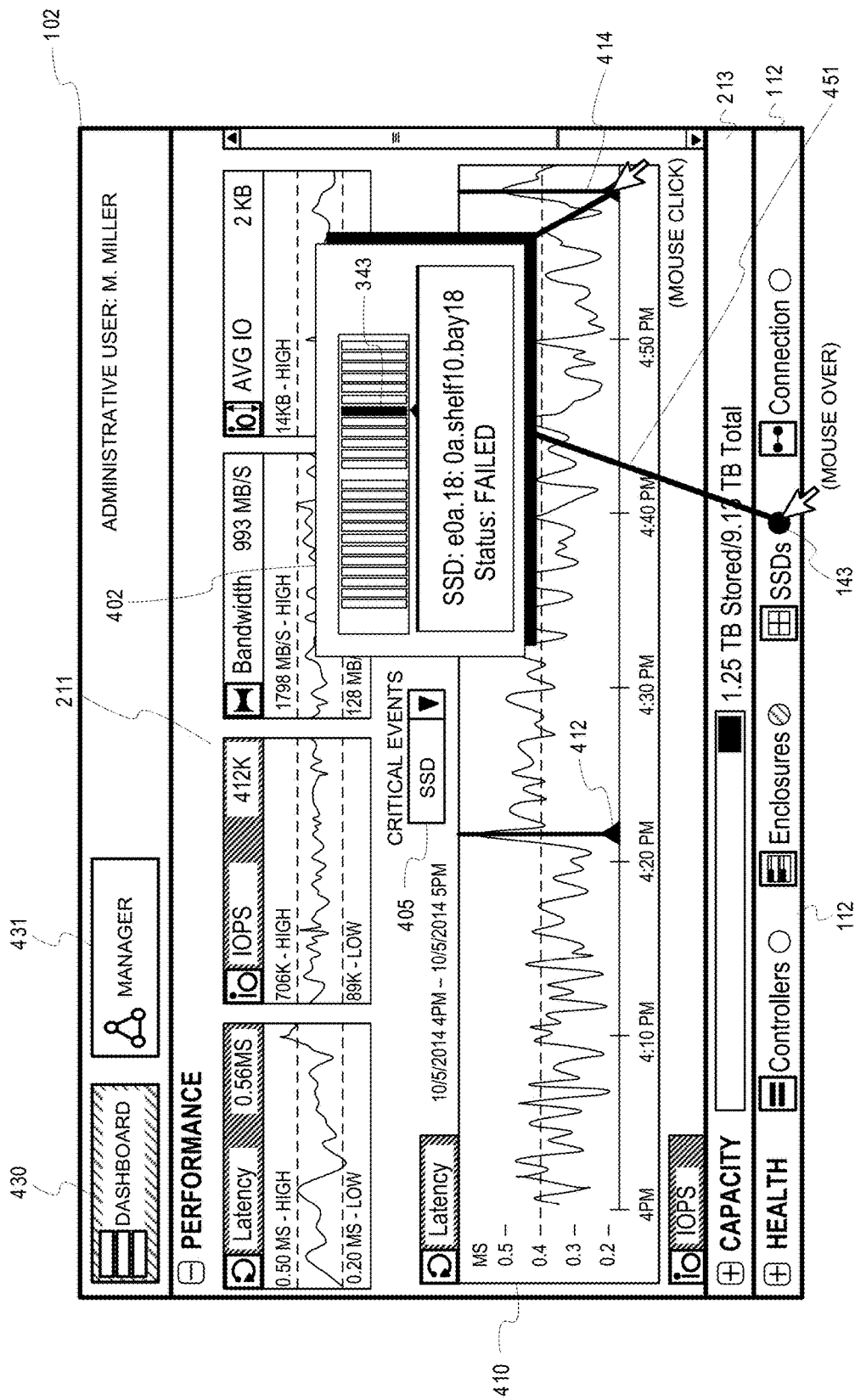
FIG. 4 is an example illustration of a system management tool configured to present linked indicators via views in a digital dashboard.
Figure 5:
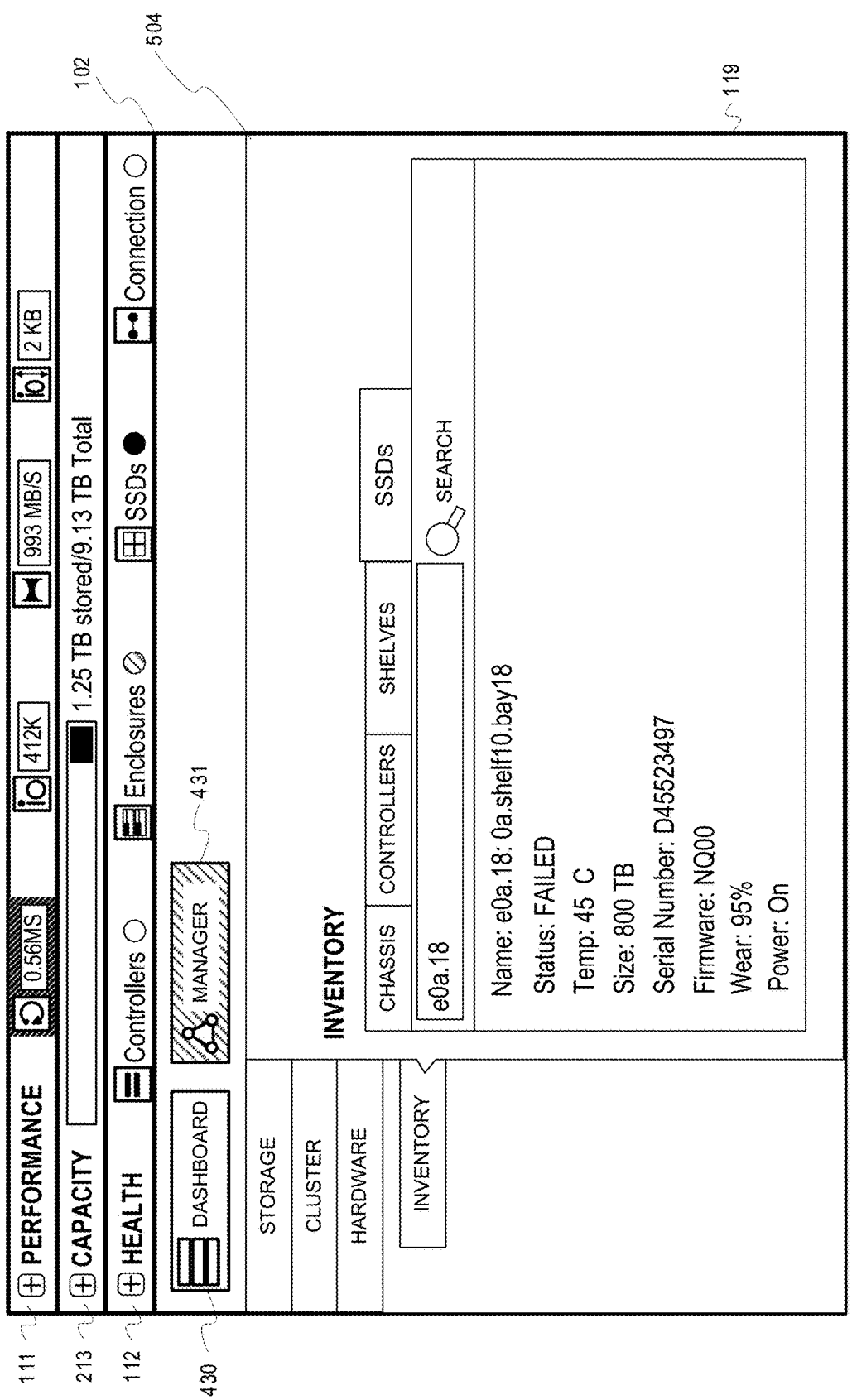
FIG. 5 is an example illustration of a system management tool configured to continuously present indicators of operational information for selected operational categories of a storage system when a drill-down operation occurs to an expanded view.

In other examples, the system management tool 102 can present operational information for all categories even when the dashboard 104 is no longer presented. In FIG. 4, the system management tool 102 includes mode toggles 430 and 431, which can toggle and indicate a mode for the system management tool 102. Mode toggle 430 indicates whether the system management tool 102 is in the dashboard mode, and presents the dashboard 104 when selected. Mode toggle 431 indicates whether the system management tool 102 is in a more detailed mode called the manager mode 504 (see FIG. 5) and presents the manager mode 504 when selected. As shown in FIG. 5, the manager mode 504 can provide configuration functionality, reporting functionality, and fine detail for any given one of the elements 180 of the storage system 100. In some instances, the system management tool 102 automatically switches to the manager mode 504 when a drill down occurs to an expanded view in the dashboard 104. For example, in FIG. 4, if a graphical indicator 343 of a failed SSD were to be selected, then, as shown in FIG. 5, the manager mode 504 appears and specifies detailed information about the failed SSD. The manager mode 504 also provides functionality to correct the error with the SSD, generate reports about the SSD and related hardware, manage various components of the storage system 100, etc. The manager mode 504 may include additional functionality that is not accessible, or practical, to put into the dashboard 104. Nevertheless, when the system management tool 102 switches to the manager mode 504, the system management tool 102 continues to present operational information about the storage system 100. For instance, the system management tool 102 can present the non-expanded views 111, 112, and 213 as widgets, which can snap instantly to a top border of the window 119 in which the system management tool 102 is presented.

In another example, as illustrated in FIG. 6A, the system management tool 102 can present important alerts related to the dashboard 104 in a portion of the window 119. For instance, in FIG. 6A, the system management tool 102 determines that a specific event occurs related to the performance category while in the manager mode 504. As a result, the system management tool 102 presents a first alert graphic 610 next to the mode toggle 430. The first alert graphic 610 is an encircled "P" to signify that one or more "performance" issues have occurred (e.g., that operational information for the performance category has exceeded a threshold value). A second alert graphic 612 appears to indicate a number of the performance issues (e.g., the number "2" indicates that two threshold values were exceeded). The system management tool 102 can detect when user interaction occurs with the first alert graphic 610 or the second alert graphic 612. In one example, the system management tool 102 can automatically open the dashboard 104 and present an expanded view for the category associated with the alert, in response to user interaction. In other examples, instead of automatically launching the dashboard 104, the system management tool 102 presents, in the manager mode 504, a low-level view that shows relevant information for the category associated with the alert. For example, in FIG. 6B, the system management tool 102 presents graphs 615 of the two performance issues. Thus, the system management tool 102 provides indicators of the operational information for the storage system 100 in the manager mode 504 without having to navigate away from the manager mode 504.

The system management tool 102 can also remember the last screen viewed in the manager mode 504. Thus, if a user has to navigate away from the manager mode 504, then upon returning to the manager mode 504, the system management tool 102 returns to that last screen. In another example, the system management tool 102 can remember the last screen viewed in the dashboard 104 if a user has to navigate away from the dashboard 104, then upon returning to the dashboard 104, the system management tool 102 returns to that last screen viewed from the dashboard 104. For example, the non-expanded view 111 may be expanded to show expanded view 211. The expanded view 211 may present summary and detail graphs for latency and IOPS, with certain settings and links configured for those graphs. If the expanded view 211 were to be collapsed back to the non-expanded view 111, the configurations and customizations for the latency and IOPS graphs would disappear from view. However, the system management tool 102 can remember the configurations and customizations of the latency and IOPS graphs. Thus, if the non-expanded view 111 were to be subsequently expanded, the same configurations and customizations would appear. In another example, the dashboard 104 can provide an option to either go back to the customizations or instead go back to a default setting.

In some examples, the system management tool 102 can link together two or more charts or graphs for different indicators of the same category of operational information (e.g. link latency indicators and IOPS indicators). For example, based on a request from an administrative user, the system management tool 102 can link indicator values for a given point in time, on the same graph, for both the latency and IOPS. The timing for the graphs can be synchronized (i.e., the X-axis are the same).

In some examples, the system management tool 102 color coordinates titles of summary graphs to match those of detail graphs. For example, as shown in FIG. 2, in the expanded view 211, a first summary graph 275 for latency has a colored title bar 277. This indicates that the detailed timeline graph 210 for latency is open. The detailed timeline graph 210 also includes a colored title bar 287. A second summary graph 276 for IOPS also has a colored title bar 278, which corresponds to a detailed graph 221 for IOPS, which has a colored title bar 288. The graph 221 can be similar to the detailed timeline graph 210 for latency, except that the graph 221 can show measurements for IOPS and not for latency. The majority of the graph 221 is unvisible without using a scroll bar 216. The color for the title bar 277 and title bar 287 can match. The color for the title bar 278 and title bar 288 can also match (and may be different from the color for the title bar 277 and title bar 287). The matching colors provide a visual clue that a detailed graph is opened even if it is not visible. For example, to ensure that the most important and current operational information remains in view for the performance category, the graphs 275, 276 (and any other summary graphs at the top part of the section 130), can be frozen in place at the top of section 130 so that scrolling will not remove them from view. However, scrolling in the section 130 can cause detailed graphs to come into view within the screen space allotted to section 130 on the window 119. Because any of the detailed graphs (e.g., graph 221) may be hidden within a portion of the section 130 that is not in view (i.e., in an unscrolled area), the colors on the headers of the summary graphs (e.g., graphs 275 and 276) given an indication that a respective detailed graph is open, but unvisible, within an unscrolled area of section 130. In some examples, a mouse click on a header for a summary graph can toggle a detail chart on and off.

Figure 7:
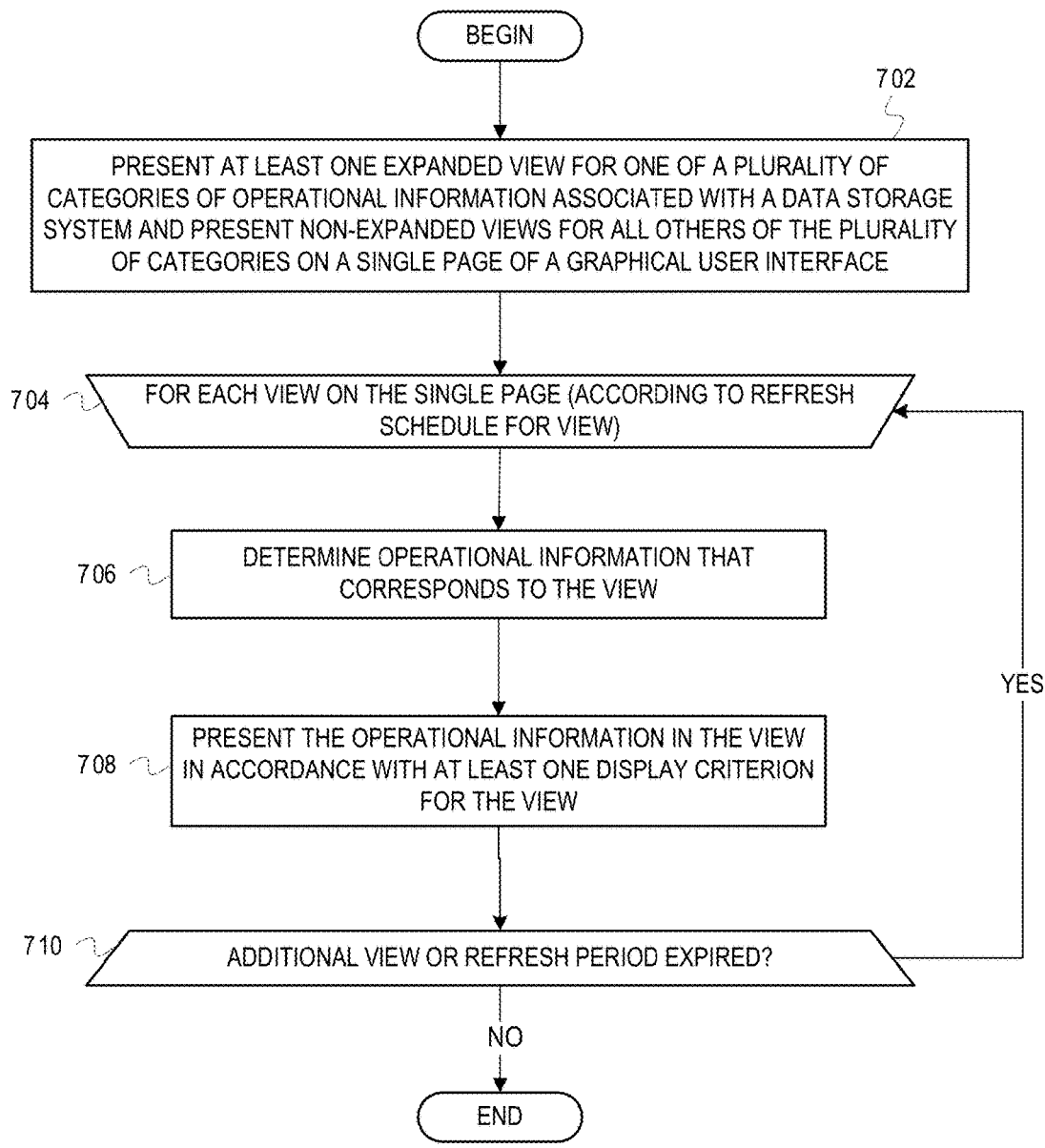
FIG. 7 is a flow diagram ("flow 700") of example operations for determining and automatically updating operational information in dashboard indicators for a system management tool of a storage system.

FIG. 7 is a flow diagram ("flow 700") of example operations for determining and automatically updating operational information in dashboard indicators for a system management tool of a storage system.

At block 702, a system management tool presents at least one expanded view for one of a plurality of categories of operational information associated with a storage system and presents non-expanded views for all others of the plurality of categories on a single page of a graphical user interface. For example, the system management tool may be a web based application. In response to user input from a system management device connected to the storage system, the system management device opens the system management tool in a web browser. The system management tool includes a dashboard with a plurality of sections that correspond to the plurality of categories of operational information as described previously. At least one of the plurality of sections presents a view for the corresponding one of the categories with a different level of detail than the others. One of the levels of views is a non-expanded view that is miniaturized, which takes up a defined minimal space on the dashboard. A non-expanded view can change, or expand, from a minimal size to a larger size. One example of a non-expanded view is a status bar (also referred to herein as a "mini-bar") that has an expansion control, which when selected changes the size of the status bar from a minimal size to a larger size. However, an expansion control is not necessary. In other examples, a non-expanded view may be incorporated into one or more of a small window that attaches to a border of the dashboard, a toolbar of the dashboard, a pop-up of the dashboard, a text box of the dashboard, or other types of user interface components.

The system management tool can manage the expansion of the non-expanded tool in other ways that do not require a direct interaction with an expansion control. For instance, the system management tool can detect when an event originates from outside the non-expanded view. The event may originate from user input outside of the non-expanded view, such as when a dropdown menu item is selected, when a keyboard key combination is entered, when a button in another section is selected, etc. The event may further occur without direct user input, such as by an automated operation of the system management tool. For instance, the system management tool may detect that a major threshold is exceeded, or that a major failure occurs, for some element of the storage system that requires immediate attention. The system management tool can evaluate the event against an expansion rule set to determine whether the non-expanded view should be changed in size in response to the event. If the system management tool indicates that the non-expanded view should be expanded, the system management tool can automatically expand the view. For instance, the system management tool can cause a small window to increase in size, can replace a toolbar with an expanded view, can remove a popup and replace it with an expanded view, etc.

In some examples, each of the views is positioned in a separate section in accordance with a defined layout of a digital dashboard. The sections maintain a relative position to each other. A "Performance" section can be on the top of the single page of the dashboard; a "Capacity" section can be in the middle part of the dashboard; and a "Health" section can be on the bottom part of the dashboard. When the views expand and collapse, they maintain their relative positions according to the positions of the sections of the dashboard layout.

The non-expanded views take up as little space on the single page as possible, yet are large enough to show at least one value from the operational information in at least one indicator. The non-expanded view can present in the at least one indicator only the most current measurement of the at least one value from the operational information.

In some instances, the system management tool is configured to expand the non-expanded view to take up as much space on the dashboard as possible, while still presenting, at all times, non-expanded views for the other categories of operational information. For instance, when any one of the non-expanded views is expanded, the system management tool collapses all other views that are expanded into non-expanded views.

In FIG. 7, at block 704, the system management tool initiates a loop for each view on the single page to gather and present specific operational information on the dashboard. The loop occurs periodically so that operational information presented on the dashboard is refreshed periodically. Each view may have a different refresh rate depending on the category of operational information and/or depending on a level of detail for the view. For example, a view associated with the performance category may be refreshed every 2-3 seconds; a view associated with the capacity category may be refreshed every 10 seconds; a view associated with the health category may be refreshed every 30 seconds.

In FIG. 7, at block 706, the system management tool determines operational information that corresponds to the particular view that is presented. In some instances, the system management tool determines operational information by determining measurements of elements of the storage system. Measurements can be of a physical state of hardware (e.g., temperature, power level, etc.). Measurements can also be of a usage of the hardware by software (e.g., an amount of data written to the hardware using data read/write computer programs, a timing of reads and writes to the hardware, an amount of data compressed, etc.). The system management tool can determine measurements in various ways such as by directly taking measurements from hardware or by querying software that has already collected the operational information. For instance, the system management tool can periodically access hardware sensors of the storage system that provide data regarding operational information of the hardware (e.g., a temperature, a power level, etc.). In another instance, the system management tool can periodically access data stores that include data about the system elements (e.g., access event logs, access configuration files, access error reports, access driver data, etc.). In another instance, the system management tool can subscribe to services that provide data about the elements of the storage system.

Figure 8:
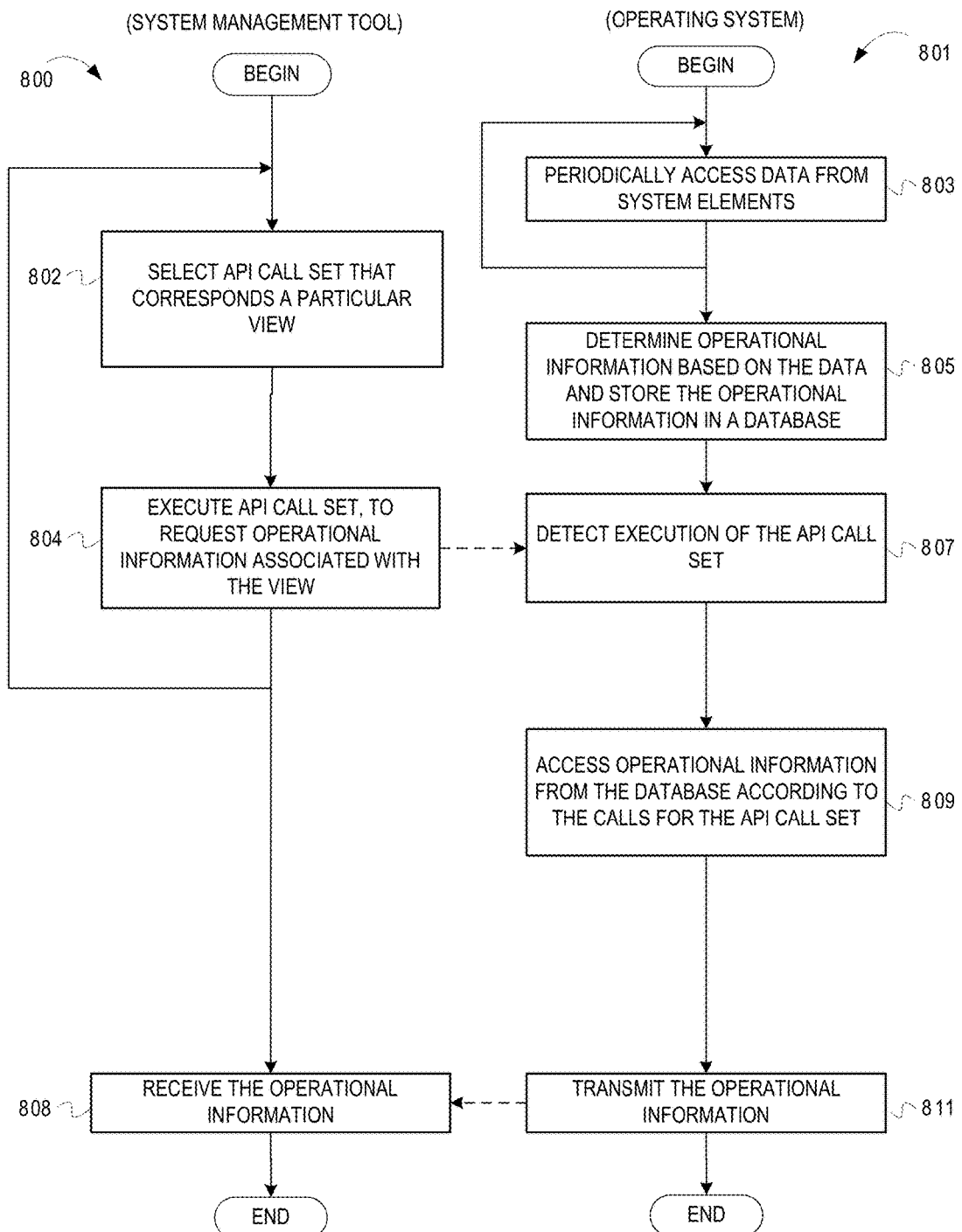
FIG. 8 illustrates example flow diagrams of example operations between an operating system and a system management tool of a storage system for determining operational information.
Figure 9:
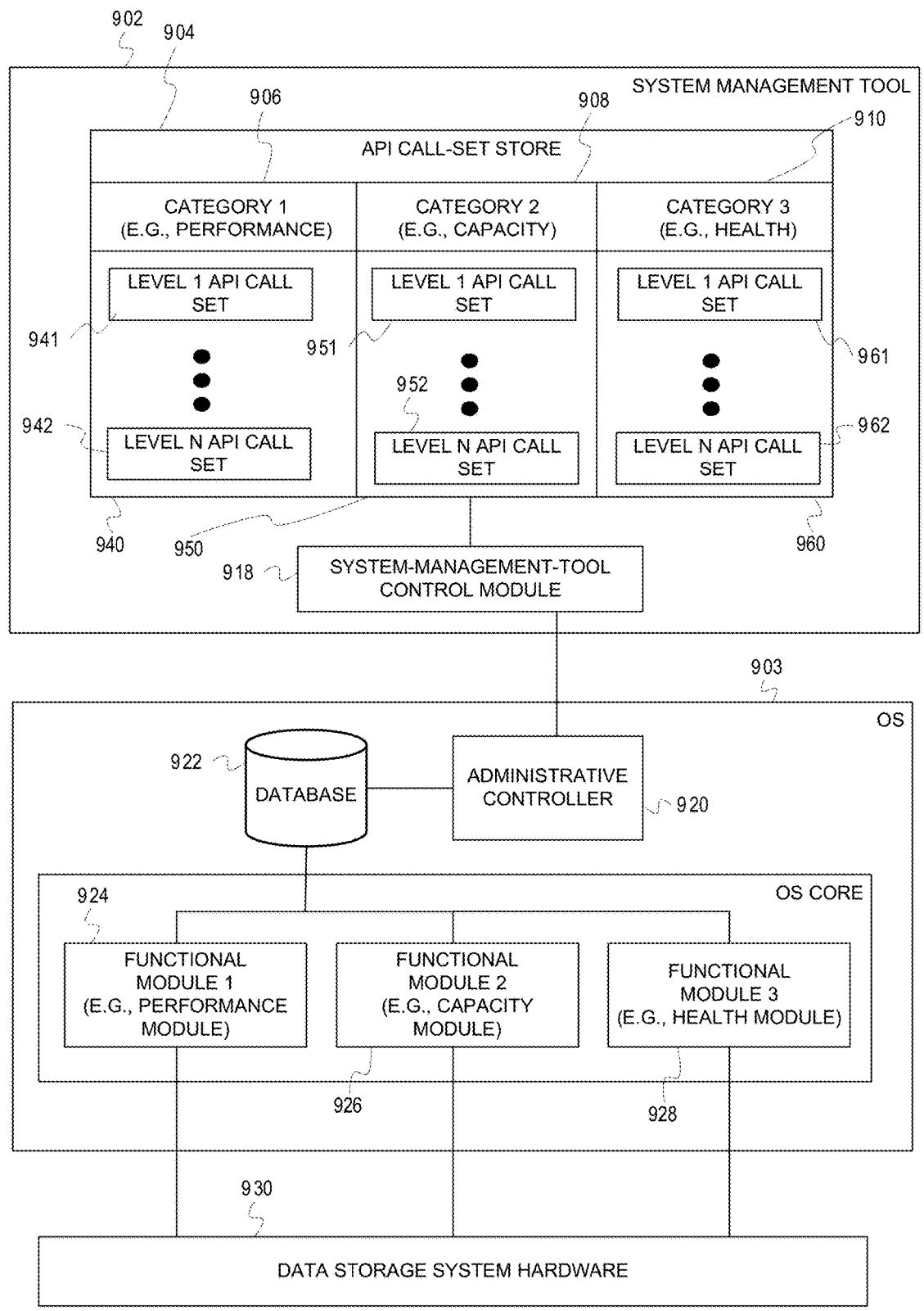
FIG. 9 is an example architecture diagram of a system manager and operating system for a system management tool of a storage system.
Figure 10:
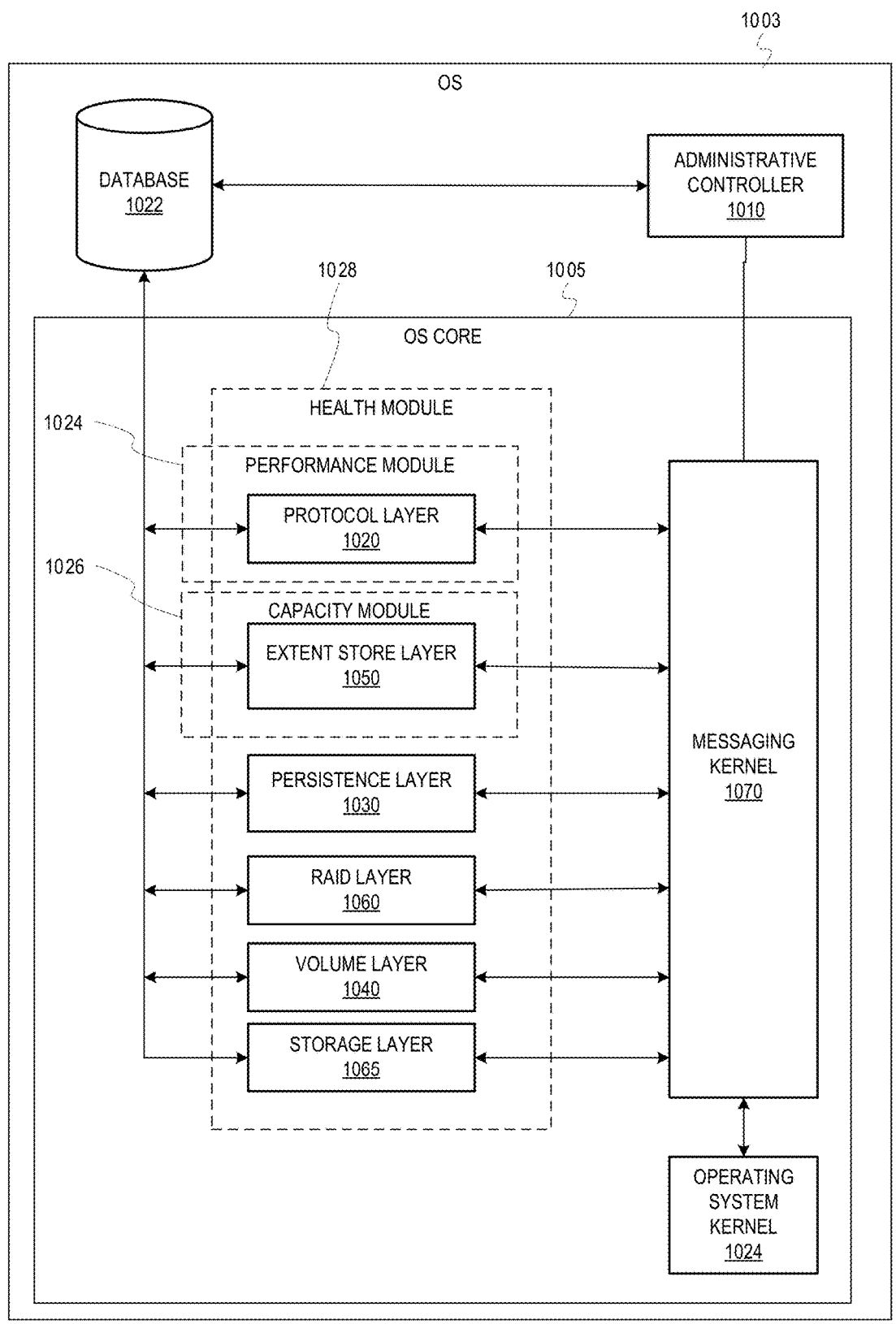
FIG. 10 is an example architecture diagram of an operating system that provides access to operational information for a system management tool.

The system management tool can query an operating system for operational information. For example, the system management tool opens a communication link with an operating system of the storage system, and makes application program interface (API) calls to obtain, from the operating system, the operational information. The operating system provides the operational information according to the instructions associated with the API calls. FIGS. 8-10 illustrate examples of determining operational information from an operating system. Briefly, FIG. 8 illustrates selecting and executing a specific API call set that corresponds to the particular view. Based on the instructions from that particular API call set, the operating system responds with the appropriate operational information. FIG. 9 is an example architecture diagram showing a system management tool configured to select API call sets and an operating system configured to respond to API calls. FIG. 10 is an example architecture diagram of the operating system for the storage system. FIGS. 8-10 will be described in more detail after the description of FIG. 7.

The system management tool can also determine operational information by determining operational analytics. For example, the system management tool can determine measurements that show an amount of storage on the system that occurs over a time period. The system management tool can perform analytics on those measurements by analyzing the amount of storage over a certain portion of the time period using storage efficiency models and algorithms. Based on the analyzing, the system management tool can determine a storage efficiency trend. In another example, the system management tool determines measurements for a change in a hardware device's condition, such as a change to the hardware device's temperature. The system management tool can perform analytics on those measurements by evaluating the change in the hardware device's condition to other instances of similar hardware devices that failed under similar conditions. Based on the analysis, the system management tool can predict when or how the hardware may fail. In another example, the system management tool can determine measurements of which hardware is consuming the most resources (e.g., using the most bandwidth, storing the most data, etc.). The system management tool can perform analytics on those measurements by applying optimization algorithms using the devices and resources as variables in the optimization problem. Based on the analysis, the system management tool can determine an optimal allocation of the resources and/or an optimal usage pattern.

In some instances, the system management tool performs a filtering to some of the operational information based on a user role. For instance, an administrative user may have a user role that is related to only a portion of the storage system, or to a particular use of the storage system. For instance, the user role may include responsibility for a given workload task to which only a certain portion of the storage elements of the storage system have been allocated. In another example, the user role may include responsibility over a certain department of the organization that only uses portions of the total storage system. For instance, the department may be allocated only 15% of the total data storage capacity. When the administrative user logs in to the system management tool, the system management tool can determine the user role based on the user credentials entered into a login screen of the system management tool. Based on the user role, the system management tool determines that only a certain percentage of storage capacity is allocated to the user role, not all of the capacity of the storage system. Furthermore, the system management tool determines that only certain portions of the total system hardware may be related to the user role, not all of the hardware of the storage system. Furthermore, the system management tool determines that only certain operational information related to the specific data usage associated with the user role is relevant to the user, not all of the data usage of all of the storage system. As a result, the system management tool can filter the operational information accordingly, only determining the specific operational information related to the user role.

In FIG. 7, at block 708, the system management tool presents the operational information in the view in accordance with at least one display criterion for the view. The display criterion is employed to ensure presented operational information provides continual comprehensive awareness of operational information. The display criteria may be related to, but not be limited to, interface control settings, threshold requirements, size and space limitations, timeline ranges, concurrent presentation rules, refresh rates, functional statuses, error messages, user roles, etc.

The system management tool presents non-expanded views and expanded views on a single page of a digital dashboard. For instance, as described in FIG. 1, the system management tool 102 presents the performance non-expanded view 111 on the dashboard 104. The dashboard 104 fits into a single page on a display. A single page of the dashboard 104 includes a visible portion of screen area associated with the dashboard 104. For instance, in FIG. 1, the dashboard 104 is included within a window 119 on which the system management tool 102 is displayed. The non-expanded views 111 and 112, and the expanded view 113 are all contained within the window 119, which is entirely presented on a display. The system management tool 102 maintains visibility of the different operational information on the display without manipulation (e.g., without needing to scroll to see the non-expanded views). In other words, all non-expanded views, as well as at least a portion of any expanded view, remains visible at all times in the window 119 in which the dashboard 104 is displayed.

In some cases, the system management tool 102 can configure the dashboard based on settings or characteristics of a display device. For example, the system management tool 102 detects a current screen size for a display device of the system management device 181. The system management tool 102 sets size dimensions for the window 119 on which the system management tool 102 is presented to fit within the size dimensions for the screen size of the display. In other examples, the system management tool 102 detects a default window size, which may be smaller than the screen size for the display device, and sets the size dimensions for the window 119 to the default window size. When launched, as a default, the system management tool 102 may present all of the non-expanded views 111, 112, and 213 to ensure that context is provided for all of the most current operational information for the storage system 100. A user may then expand one of them, such as the non-expanded view 213, which then causes the system management tool 102 to appear as it does in FIG. 1. In some aspects, the window 119 is changed in size such that a portion of the window is no longer visible on the display. The change in size may initially cause one or more of the non-expanded views 111, 112 or 213 to move off the screen (at least to some degree) and become non-visible or partially visible. The system management tool 102 can detect that the borders of the window 119 are outside the visible screen area, and that at least a portion of the non-expanded views 111, 112, or 213 may be non-visible. Consequently, the system management tool 102 can automatically reposition any of the non-expanded views 111, 112, or 213 that were moved off the screen, to appear within the visible portion of the screen. For instance, the system management tool 102 can automatically resize the window 119 so that it fits within the visible screen area. In another example, the system management tool 102 causes whichever of the non-expanded views 111, 112 or 213 that had become non-visible to move automatically into the visible screen area. For instance, the system management tool 102 can cause the desktop to launch a separate window for a non-visible, non-expanded view, place the content for the non-visible, non-expanded view in the separate window, and move the separate window into a visible portion of the screen area. The system management tool 102 can further pin, or lock, the separate windows into a highest position in a window layer stack so that they cannot be obscured by other windows.

In yet other examples, the system management tool 102 can resize and/or reorient of any of the non-expanded views 111, 112, or 213 if a portion of the non-expanded views 111, 112, or 213 become non-visible. For example, the window 119 may inadvertently be horizontally resized or moved by a user such that a portion of the window 119 moves off the visible screen area (e.g., the left hand side becomes non-visible or the right-hand side becomes non-visible). In other examples, other windows may open or be moved on a desktop, which can obscure a view of some, or all, of the window 119. In such scenarios, the system management tool 102 can resize and/or reorient any of the non-expanded views 111, 112, or 213. For instance, the system management tool 102 can cause any of the non-expanded views 111, 112, or 213 to rotate horizontally and snap to a side of the window 119 that is visible. In other examples, the system management tool 102 can resize the content on any of the non-expanded views 111, 112, or 213. For example, if a portion of the non-expanded view 213 was obscured, the system management tool 102 may remove, abbreviate, shrink or otherwise modify text (e.g., replace the word "Capacity" with a "C," remove the words "stored" and "total," etc.). In another instance, the system management tool 102 may resize the bar graphic 214 on the non-expanded view 213 or remove it.

In some aspects, the system management tool 102 presents a textual representation of operational information. For instance, in FIG. 1, the system management tool 102 presents one line of text on the non-expanded view 111 (e.g., the words "PERFORMANCE" and the text "0.56 MS," "412K" "993 MB/S," and "2 KB" are aligned horizontally, in one row). The one line, or single row, of text takes up minimal vertical space on the display. Furthermore, the text only shows the most current values of the operational information for the performance category. In some examples, the system management tool 102 may also include graphs, meters, or other non-textual information on a non-expanded view with, or in place of, the text. In some examples, the system management tool 102 can present non-expanded views horizontally instead of vertically.

An expanded view can present the most important operational information as well as less important operational information. For example, in FIG. 1, the expanded view 113 shows, in graph 151, a ratio of an actual amount of stored data compared to a storage limit ("storage ratio"). The storage ratio can be indicated as important information to present in both the expanded view 113 and the non-expanded view 213 because no new data can be stored to the storage system if the actual amount of stored data reaches the limit. Thus, that important information is presented as an indicator in the non-expanded view 213 (see FIG. 2). However, the expanded view 113 also shows additional information, such as operational information related to storage efficiency, which can be indicated as less important than the storage ratio. For instance, expanded view 113 shows an indicator 152 that specifies a certain amount of actual data that has been written to the storage system 100 as opposed to an indicator 153 that specifies the actual storage space used. The difference between the amount show in the indicator 152 and the amount shown in the indicator 153 corresponds to data organization and encoding (e.g., use of deduplication and/or compression). In FIG. 1, the expanded view 113 shows a degree of deduplication savings to the actual data storage—"10.7 to 1 Savings from Deduplication". The expanded view 113 shows an amount of storage savings due to compression algorithms of the storage system 100—"4.46 to 1 Savings from Compression".

In addition to information about storage savings, the expanded view 113 may present information about efficiency, such as an estimated writable space to a purchased space ratio (e.g., maximum storable space multiplied by space savings divided by purchased space). Further, expanded view 113 may present information about a ratio of provisioned space to estimated writable space. All of this additional information is value for presentation on the expanded view 113, however only the storage ratio has been configured to be included on the non-expanded view 213. The system management tool 102 provides options to configure, or select, which of the operational information is to be included on the non-expanded views.

Returning to the description of FIG. 7, in some examples the system management tool presents the operational information in a view in accordance with display criteria by detecting that one or more values from the operational information approach a threshold requirement.

At block 710, the system management tool determines whether there is an additional view to process or whether a refresh has expired or been reached. If there is an additional view to process or the refresh period has been reached, then control returns to processing block 704. Although depicted as a sequence of operations, the loop can be terminated early or be interrupted. If, during the looping operations, the view changes, then at processing block 706, different operational information (or different levels of operational information) will be determined and, at processing block 708, that operational information will be presented according to different display criteria that corresponds to the new view. For example, during a first loop, a non-expanded view is presented for the performance category, as shown in FIG. 1, wherein the non-expanded view 111 is collapsed. Consequently, the operational information accessed for the non-expanded view 111 is only the most current data (e.g., the performance data for the last three seconds). However, for a second loop, if the non-expanded view 111 has been expanded, as shown in FIG. 2, then operational information for the last 10 minutes may need to be obtained for each of the summary graphs, and operational information for the last hour needs to be obtained for the timeline graph 210. Hence, the display criteria for each particular view dictate the specific operational information to be determined and/or presented. The loop can be interrupted based on certain events and can return to processing block 704 prior to a complete iteration. For example, if, prior to execution of processing block 708, a non-expanded view is expanded, then the loop instantly returns to processing block 704 to gather the operational information for the newly expanded view and present the operational information according to display criteria for that expanded view.

FIG. 8 illustrates example flow diagrams of example operations between an operating system and a system management tool of a storage system for determining operational information. In FIG. 8, a first flow diagram ("flow 800") illustrates operations performed by a system management tool. A second flow diagram ("flow 801") illustrates operations performed by an operating system of a storage system in parallel with flow 800. The description of FIG. 8 will refer to both FIGS. 9 and 10.

At block 803, the operating system periodically accesses data from elements of the storage system. For instance, as shown in FIG. 9, an operating system 903 includes functional modules 924, 926, and 928. The functional modules 924, 926, and 928 are each related to a different category of operational information, such as the performance, capacity, and health categories mentioned previously. Each of the functional modules 924, 926, and 928 are configured to communicate with the elements of the storage system including hardware and/or software components. For example, the functional modules 924, 926, and 928 have functionality to continually communicate with, and collect data from, storage system hardware 930.

Returning to the flows of FIG. 8, the processing block 803 loops back to indicate a repeating process. For example, each of the functional modules 924, 926, and 928 may record operational information for corresponding categories at same or different rates. The functional modules may be separated in their tasks according to the different categories of operational information presented on the dashboard of the system management tool. For instance, functional module 924 is configured to determine performance operational information. The functional module 924 measures and records how much data traffic is coming in to the storage system. Functional module 926 is configured to determine capacity operational information. The functional module 926 measures how much memory is being used by elements of the storage system. Functional module 928 is configured to determine health operational information, including a status of hardware elements and a status of software elements.

At block 805, the operating system determines operational information based on the data accessed from the system elements and stores the operational information in an operating system database. For instance, in FIG. 9, when the functional modules 924, 926, and 928 access the system elements, they generate data using system tracking programming and store the data as counters (e.g., performance counters, capacity counters, etc.) in the database 922. Some of the functional modules 924, 926, and 928 use algorithms to determine operational information. For instance, a capacity module (e.g., functional module 926) computes capacity saving and efficiency (e.g., savings from compression, savings from deduplication, difference between stored and written data, etc.), and stores the data in a database (e.g., in database 922). In another example, a performance module (e.g., functional module 924) performs computations on the data, to generate measurements regarding latency, IOPs, bandwidth, average I/O, etc., and stores the measurements in a database (e.g., in database 922).

In FIG. 8, at block 802, the system management tool selects an API call set that corresponds to a particular view. In one example, a view template associated with the view indicates one or more identifiers related to different indicators on the view. The one or more identifiers identify types or levels of data that the indicators require to present in the view. The identifiers are passed as parameters to a data collection module, which can use the parameters to determine what operational information to collect from the operating system for the particular indicators of the view.

In another example, as shown in FIG. 9, a system-management-tool control module ("control module") 918 reads one or more identifiers indicated by the view. The identifier(s) identify the particular type of view and/or one or more indicators of the view. The control module 918 uses the identifier(s) to select a specific API call set(s). For example, the store 904 is configured with identifiers of the views. The control module 918 looks up the identifier(s) in the store 904, which correspond to the particular API call set(s).

The store 904 includes separate groups of API call sets 940, 950, and 960 for different categories of operational information 906, 908, and 910 (e.g., for performance, capacity, and/or health). Each of the separate groups of call sets 940, 950, 960 includes separate call sets for different levels of detail associated with the views. For example, non-expanded views correspond to a first level of API call sets (e.g., the "Level 1 View API Call Sets"). The first level of API call sets includes call sets for only the most important operational information. For instance, the first level of API call sets in the store 904 call for most recent, time-based values of the operational information to indicate in time-based textual meters. For instance, API call set 941 calls for only the most recent performance operational information to be presented in text indicators and does not call for a wide time-range of performance operational information. API call set 951 calls for the amount of actual storage usage to present on a compact bar graph indicator. API call set 961 calls for only the functional status of certain hardware devices to present as color-coded icon indicators. Expanded views include more extensive sets of API calls that call for more detail than that of non-expanded views. For example, the API call set 942 calls for a sufficient amount of data to draw time-range graphs with a history of performance data. In another example, API call set 952 calls for sufficient data to draw a capacity usage graph, a space savings graph showing a history of capacity savings, and so forth. API call set 962 calls for sufficient data to draw a hardware component graphic showing status, characteristics, properties, etc. for all of the elements of a specific hardware device or type.

At block 804, the system management tool executes the specific API call set to request operational information associated with the view. For instance, in FIG. 9, after the control module 918 accesses the appropriate call set for the view, the control module 918 executes (e.g., via a processor or controller of the storage system) instructions in the API call set. The instructions make calls to the operating system for a specific amount of data. In FIG. 9, when the control module 918 executes the call sets, it transmits API calls to the administrative controller 920.

Referring momentarily back to FIG. 8, the processing blocks 802 and 804 loop according to a refresh rate. If, during the next iteration of the loop, the view changes, then the system management tool selects a different set of API calls that correspond to the new view. In some examples, the system management tool executes API call sets according to different refresh rates based on different categories of operational information. For example, referring to FIG. 9, the control module 918 may call for operational information of the first category 906 (e.g., for performance operational information) every 2-3 seconds. The control module 918 may call for operational information of the second category 908 (e.g., for capacity operational information) every 8-10 seconds. The control module 918 may call for operational information of the third category 910 (e.g., for health operational information) every 20-30 seconds. The amount of time between executions of the call sets depends on the sensitivity of the operational information that needs to be reported. Calls for performance operational information may be repeated frequently so that a system administrator can track performance trends in lower increments of time before the trends become insurmountable. On the other hand, capacity operational information may be less sensitive than performance operational information if the capacity data storage is far from being completely used up. In other words, if the capacity storage is far from being completely filled up given certain system conditions, then a potential problem for capacity is less likely than a potential problem for performance. Consequently, tracking capacity trends in that scenario would be less sensitive than tracking performance trends. As a result, the control module 918 would request capacity operational information less frequently than performance operational information. Furthermore, health operational information may be even less sensitive than capacity or performance operational information, in certain scenarios. For example, a storage system may be designed and built with redundant components that temporarily compensate for failure of a system component. Consequently, failure of a component may have less immediate operational impact on the operating system than a performance problem or a capacity problem. Therefore, while the failed component would eventually need attention, a need to address the failed component may be less urgent than a need to address issues for other categories of operational information, such as performance issues and capacity issues. As a result, health operational information may be tracked less often than capacity or performance operational information.

In some instances, the control module 918 automatically adjusts the frequency of the tracking per category of operational information based on the conditions of the storage system at any given time. For instance, the control module 918 detects that a value from capacity operational information reaches, or is close to reaching, a critical level or threshold for a particular workload of the storage system (e.g., the total capacity storage is within a few percentage points of being filled up). Consequently, control module 918 increases the refresh rate for collecting capacity operational information to every 5-6 seconds instead of a default amount of 8-10 seconds. The control module 918 may further detect that the storage system is performing a high amount of data writes to data storage drives at the time, which would cause the capacity to fill up even faster. Consequently, the control module 918 may further increase the refresh rate for capacity operational information to every 2-3 seconds. In some instances, the control module 918 increases the refresh rate proportional to a degree to which a value of the operational information approaches a threshold value. For example, for every percentage point increase of capacity storage past a 90% capacity usage level, the system may increase the refresh rate by an additional 0.5 seconds until reaching a highest indicated refresh rate.

At block 807, the operating system detects execution of the API call set. For example, in FIG. 9, when the control module 918 executes the API call set, the calls are directed to the operating system ("OS") 903. An administrative controller 920 is configured to detect when calls are directed to the OS 903. The administrative controller 920 receives, from the calls, the request for the operational information that corresponds to the view. The administrative controller 920 includes OS-specific, private API's that are internal to the OS 903. The private API's are not exposed to external applications or external sources, such as to the system management tool 902. The administrative controller 920 receives the API calls (e.g., in a hyper-text transfer (HTTP) protocol) from the control module 918 and converts the calls into OS-specific calls using private APIs accessible to the administrative controller 920 and not accessible to the control module 918.

At block 809, the operating system accesses the operational information from the database. For instance, in FIG. 9, after the administrative controller 920 converts the calls to the OS-specific calls, the administrative controller 920 executes reads requests, from the database 922, for the data stored therein that pertains to the operational information requested by the control module 918. As mentioned previously, the data stored in the database 922 was populated periodically by the functional modules 924, 926, and 928.

At block 811, the operating system provides the operational information to the system management tool. For instance, in FIG. 9, the administrative controller 920 transmits the operational information obtained from the database 922 to the control module 918.

At block 808, the system management tool receives the operational information. For instance, in FIG. 9, the control module 918 receives the requested operational information from the administrative controller 920. Subsequently, the control module 918 can present the operational information according to display criteria of the view.

In some instances, the system management tool detects operational information for two different categories and incorporates the operational information for the two different categories into a single view. Thus, the determining of the operational information includes some overlap of API calls for the two different categories. For instance, a view of a first category (e.g. "Performance") may be configured to display an event overlay from a second category (e.g., "Health"). As shown in FIG. 4, a dropdown 405 (from the "Performance" category) is selected to show events for the SSD (of the "Health" category). Consequently, the system management tool will select the appropriate API call set(s) that corresponds to the performance graphs as well as the API call set(s) that corresponds to health event data for the SSD hardware component. Based on the operational information obtained via the API call sets, the system management tool generates the appropriate performance graphs.

In FIG. 9, the operating system 903 was described. The operating system 903 may be one of many available operating systems for storage systems, such as the NetApp Mars™ Storage Operating System ("Mars OS") available from NetApp Inc. FIG. 10 is an architecture diagram of an operating system ("OS") 1003 that provides access to operational information for a system management tool. The OS 1003 includes a plurality of software modules or layers that cooperate with functional components of a storage system (e.g. with nodes of a cluster network) to provide distributed storage in the storage system and to provide continuous context for operational information of a storage system. The OS 1003 includes an administration controller 1010 similar to the administration controller 920 described in FIG. 9. The OS 1003 further includes a protocol layer 1020, an extent store layer 1050, a persistence layer 1030, a Redundant Array of Independent Disks (RAID) layer 1060, a volume layer 1040, and a storage layer 1065. The layers are incorporated into a core 1005 of the OS 1003. The protocol layer 1020, extent store layer 1050, persistence layer 1030, RAID layer 1060, volume layer 1040, and storage layer 1065 are interconnected with a messaging kernel 1070. The messaging kernel 1070 may provide a message-based (or event-based) scheduling model (e.g., asynchronous scheduling) that employs messages among the layers. The messaging kernel 1070 allocates processing resources from an operating system kernel 1024 to execute the messages. Each layer may be implemented as one or more instances (e.g., processes) executing one or more threads (e.g., in kernel or user space) that process the messages passed between the layers such that the messages provide synchronization for blocking and non-blocking operation of the layers.

The protocol layer 1020 is configured to communicate with a client that requests data storage services from the OS 1003. The client may issue packets that include: (i) file-based access protocols, such as the Network File System (NFS) protocol over the Transmission Control Protocol/Internet Protocol (TCP/IP), when accessing information on a storage system; and (ii) block-based access protocols, such as the Small Computer Systems Interface (SCSI) protocol encapsulated over TCP (iSCSI) and SCSI encapsulated over FC (FCP). The client and protocol layer 1020 exchange discrete frames or packets configured as I/O requests (e.g., a read or write request). The protocol layer 1020 receives the I/O requests and forwards them to the persistence layer 1030.

The persistence layer 1030 records the requests into a persistent write-back cache. The persistence layer 1030 may forward an I/O request to the volume layer 1040 to execute on a node of a cluster in the storage system.

The volume layer 1040 also maintains states of storage components, performs data management functions (e.g., creation of snapshots and clones), and manages other storage volume metadata (e.g., metadata embodied as mappings from logical block addresses (LBAs) of a logical unit (LUN) of the storage system). The volume layer 1040 also records forwarded requests (e.g., information or parameters characterizing the request), as well as changes to volume metadata, in dedicated logs.

The extent store layer 1050 is responsible for storing extents prior to storage on storage components (e.g., on solid state drives on a storage array). An extent is a variable length block of data that may be aggregated from one or more write requests directed to LBAs. The extent store layer 1050 also provides extent keys to the volume layer 1040 (in response to a forwarded write request). An extent key is a unique identifier associated with a storage location for an extent. The extent store layer 1050 is also responsible for retrieving data (e.g., an existing extent) using an extent key (e.g., in response to a forwarded read request). The extent store layer 1050 may also be responsible for performing de-duplication and compression on the extents prior to storage. The extent store layer 1050 may also maintain in-core mappings (e.g., embodied as hash tables) of extent keys to storage locations on the storage components of the storage system. The extent store layer 1050 may also maintain a dedicated log of entries that accumulate requested "put" and "delete" operations (e.g., write requests and delete requests for extents issued from other layers to the extent store layer 1050).

The RAID layer 1060 organizes data storage components (e.g., SSDs within a storage array) as one or more RAID groups (e.g., sets of SSDs). The RAID layer 1060 writes data "stripes" having redundant information (e.g., appropriate parity information with respect to the striped data) across a given number of SSDs of each RAID group. The RAID layer 1060 may also store a number of stripes at once (e.g., in accordance with a plurality of contiguous write operations) to reduce data relocation that may occur within SSDs.

The storage layer 1065 implements storage I/O drivers (e.g., the Linux virtual function I/O (VFIO) driver) that communicate directly with hardware (e.g., with storage controllers and with a cluster interface) cooperating with the operating system kernel 1024.

As illustrated in FIG. 10, some of the functional modules shown in FIG. 9 may be incorporated into the OS 1003. For example, a performance module 1024 (e.g., functional module 924) interacts with and/or includes the protocol layer 1020. A capacity module 1026 (e.g., functional module 926) interacts with and/or includes the extent store layer 1050. A health module 1028 (e.g., functional module 928) interacts with and/or includes the protocol layer 1020, the extent store layer 1050, the persistence layer 1030, the RAID layer 1060, the volume layer 1040, and the storage layer 1065. For instance, the RAID layer 1060 handles reconstruction if a disk has failed. The RAID layer 1060 therefore tracks and/or includes health information associated with certain hardware components of the storage system. The health module 1028 monitors the health of the components associated with the reconstruction of the disk.

Figure 11:
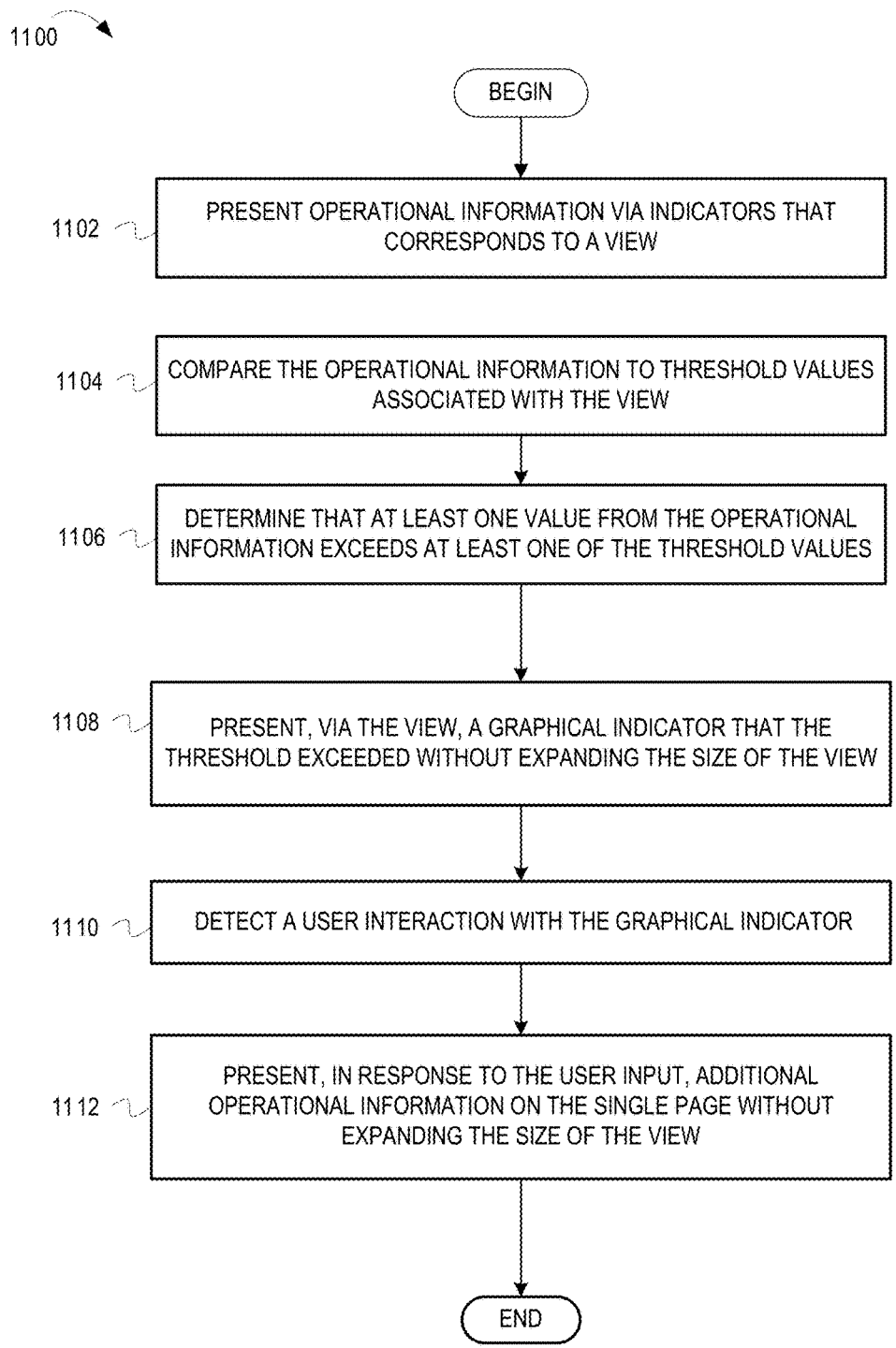
FIG. 11 is an example flow diagram of example operations for presenting indicators of operational information in a view of a system management tool according to display criteria.

FIG. 11 is an example flow diagram ("flow 1100") of operations for presenting operational information in a view of a system management tool according to display criteria. In FIG. 11, at block 1102, a system management tool presents operational information that corresponds to a view. For example, the system management tool presents a non-expanded view on a single page of a digital dashboard. Simultaneously, the system management tool presents on the single page, in a section of the digital dashboard separate from the non-expanded view, an expanded view with detailed operational information. The system tool can present the operational information on text indicators, meter indicators, graph indicators, etc.

At block 1104, the system management tool compares the operational information to threshold values associated with the view. In some examples, the threshold values are stored in configuration settings which have been set by an administrative account and/or which have been provided with the system management tool for a particular use, workload, purpose, etc. For example, in FIG. 2, the summary graphs for the "Performance" category have been configured with performance ranges. For instance, the summary graph 275 includes a high-end threshold value setting 281 (e.g., 0.50 ms) and a low-end threshold value setting 282 (e.g., 0.20 ms). Each of the performance metrics (e.g., latency, IOPS, bandwidth, and AVG IO) has a high-end threshold value setting and low-end threshold value setting. As the system management tool 102 determines operational information for the performance metrics, it compares each current measurement of the operational information against the threshold value settings.

At block 1106, the system management tool determines that at least one value from the operational information exceeds at least one of the threshold values. For instance, in FIGS. 1 and 3, the system management tool 102 determines that a measurement for the latency metric is outside the performance range (e.g., is above the 0.50 ms high-end threshold value).

At block 1108, the system management tool presents, via the view, a graphical indicator that the threshold is exceeded without expanding the size of the view. For example, the system management tool can present, in a non-expanded view, a color indicator around a textual presentation of the metric. For instance, in FIGS. 1 and 3, the system management tool 102 determines that a measurement for the latency metric is outside the performance range (e.g., is above the 0.50 ms high-end threshold value). Consequently, the system management tool 102 presents the indicator graphic 135.

In some examples, a visual characteristic of the indicator graphic 135 is time based. For instance, the indicator graphic 135 may include a red glow that can dissipate in size and/or intensity over time after the critical value was detected. If the threshold value is exceeded again, the red glow would return to the brightest and largest size. In some examples, if the threshold value is exceeded for a given period of time, then a warning graphic appears (e.g., a red flag, a clock showing the amount of time that the threshold is exceeded, a miniature graph showing the latency statistic, a pop-up showing a latency graph, etc.). The non-expanded view 111 can also show a ranges of values, small graphs of information (e.g. a spark line graph to give an idea of the trend and variation over time), a hover chart (showing a summary chart, which can lock in place with a key-stroke combination to permit further drill down), etc.

In some examples, the system management tool 102 may force windows to move, expand, or minimize based on whether thresholds are exceeded. For instance, if the dashboard 104 were obscured by another window from a separate application, or if the dashboard 104 were minimized, then some of the operational information may be momentarily not visible on the display of the system management device 181. If, however, one or more values of the operational information were to exceed thresholds, then the system management tool 102 can force the dashboard 104 to be visible again on the display, such as by causing the dashboard 104 to expand (if minimized) or come to a top of a window layer stack (if obscured by other windows).

The system management tool 102 can also show exceeded thresholds via indicators of an expanded view. For instance, the system management tool 102 can present in an expanded view, a graphical indicator. For example, in FIG. 2, the system management tool 102 presents graph 275. The graph 275 indicates a latency value exceeding threshold value setting 281.

At block 1110, the system management tool detects a user interaction with the graphical indicator. For example, in FIG. 3, the system management tool 102 detects a user input with the indicator graphic 135 or with the first time-based indicator value 131. In another example, in FIG. 4, the system management tool 102 detects a user input with the graphical indicator 143 (e.g., a mouse-click operation occurs to graphical indicator 143 associated with the failed SSD).

At block 1112, the system management tool presents, in response to the user input, additional operational information on the single page without expanding the size of the view. For example, in FIG. 3, if a user were to select the graphical indicator 143 (e.g., a mouse-click operation occurs to graphical indicator 143 associated with the failed SSD), then the system management tool 102 can cause the expanded view 312 to present a graphical representation of the hardware component that has the health problem. For instance, the system management tool 102 presents a graphical representation of a shelf 302 with SSDs included therein. The system management tool 102 also presents, within the graphical representation of the shelf 302, the graphical indicator 343 of the failed SSD. The color of the graphical indicator 343 and the color of the graphical indicator 143 can match to provide a visual clue as to which component has failed.

In another example, in FIG. 3, the indicator graphic 135 appears in the non-expanded view 111 while the "Health" section 140 is expanded. However, instead of having to expand the non-expanded view 111 to show information about the indicator graphic 135, the system management tool 102 can respond to user input with the indicator graphic 135 or with the indicator value 131 (e.g., in response to placement of a mouse cursor over the indicator value 131). The system management tool 102 presents a snapshot (e.g., a hover-over view 325) that shows a summary graph for the latency metric.

Figure 12:
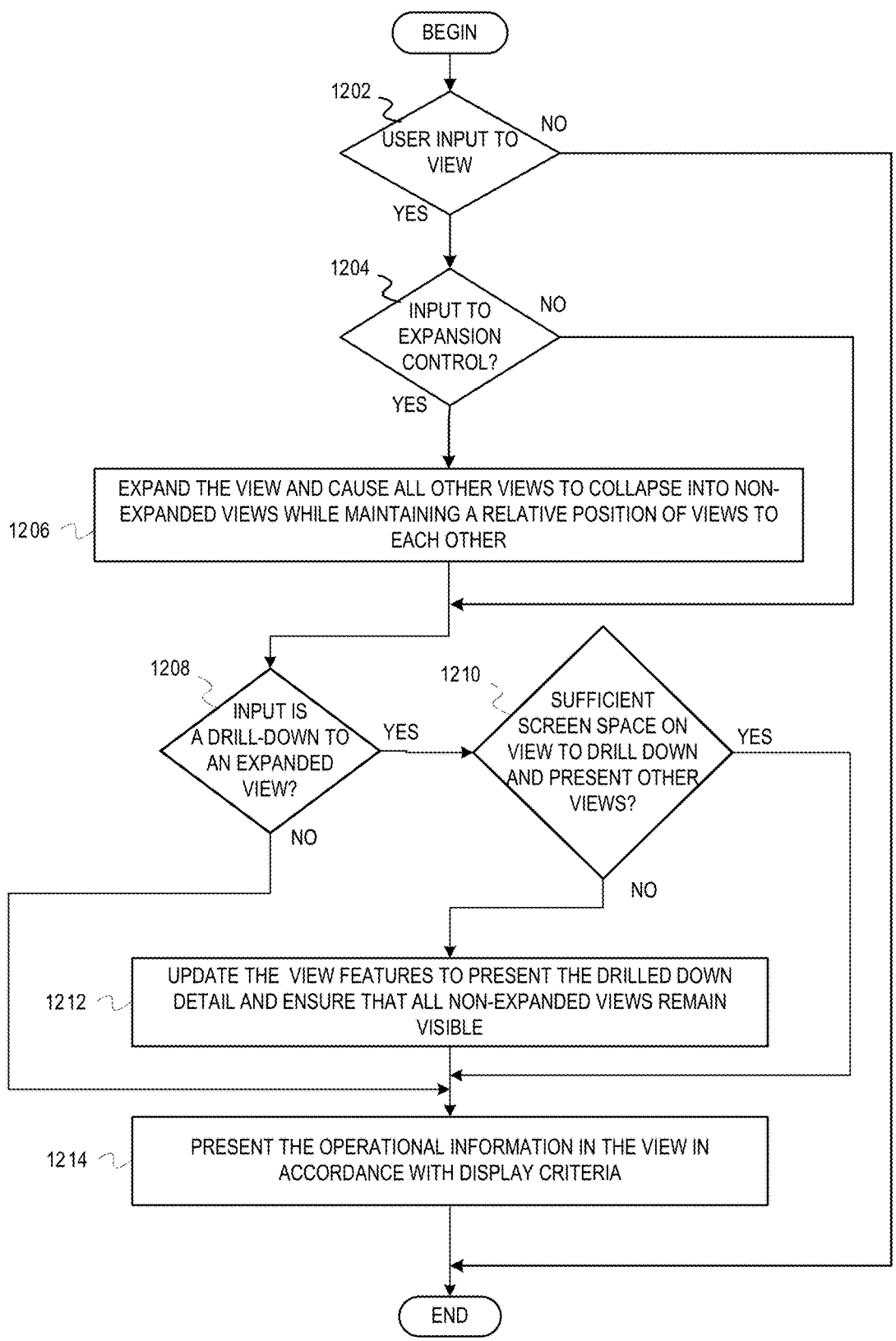
FIG. 12 is an example flow diagram of example operations for presenting indicators of operational information in a view of a system management tool according to display criteria.

FIG. 12 is an example flow diagram ("flow 1200") of example operations for presenting operational information in a view of a system management tool according to display criteria. In FIG. 12, at block 1202, a system management tool determines whether a user input occurs in a view. For example, the system management tool can detect when a user input expands a non-expanded view or when a user input opens a detailed graph in an expanded view.

At block 1204, the system management tool determines whether the user input was to an expansion control for a non-expanded view. If the user input was to an expansion control for a non-expanded view, at block 1206, the system management tool expands the view and causes all other views to collapse into non-expanded views while maintaining a relative position of the views to each other. For example, as shown in FIG. 1, a drill down operation may be initiated for the non-expanded view 111 by selecting the expansion button 115. The expansion button 115 is only an example of a graphical control element through which a drill-down operation may be initiated. In other examples, a drill-down operation may be initiated by interaction with a graph, with text, with an icon, or with some other visual indicator presented in the performance non-expanded view 111. In yet other examples, the non-expanded view 111 may be expanded by audible input, by touch input, etc.

Furthermore, when the drill-down operation occurs to the non-expanded view 111 the system management tool 102 causes the dashboard 104 to maintain a relative layout position of the different views for the different categories of operational information. For instance, in FIG. 1, the performance non-expanded view 111, which corresponds to the performance category, is above the expanded view 113, which corresponds to the capacity category. In FIG. 2, after the expansion button 115 is selected, the system management tool 102 replaces the non-expanded view 111 with the expanded view 211 on the dashboard 104. However, the vertical layout positions of the performance section 130 and the capacity section 150 have not changed. In other words, the performance section 130 remains above the capacity section 150. Furthermore, the non-expanded view 112 for the health section 140 remains below both the performance section 130 and the capacity section 150 on the dashboard 104. In some examples, the system management tool 102 provides a configuration option to specify the relative layout positions of the different categories. Furthermore, although the relative positions of the sections 130, 140 and 150 may remain the same, the positions of the boundaries of the sections 130, 140, and 150 are elastic. For example, in FIG. 2, after the expansion button 115 is selected, the system management tool 102 pushes, or snaps, the non-expanded view 213 downward toward the bottom of the single page of the dashboard 104 to rest on top of the non-expanded view 112. Thus, the frame size for the dashboard 104 does not change vertically. Rather, the system management tool 102 dynamically determines where to position the non-expanded views 111, 112, and 213 according to relative vertical layout positions. In another example, because the section 130 is positioned above the section 140, when the section 130 collapses to the non-expanded view 111, the system management tool 102 snaps the position of the non-expanded view 111 to the top of the dashboard 104.

In some examples, only one expanded view may be presented at any given time, thus causing any other views for other categories to be presented as a non-expanded view. In other examples, however, more than one expanded view may be presented. In such examples, the system management tool still maintains a relative position of the sections for the categories of operational information. For instance, if the section 130 and the section 140 were both expanded, the non-expanded view 213 for the section 150 would remain in the middle position between the section 130 and the section 140.

In some examples, the system management tool 102 rearranges the relative positions of the sections 130, 140 and 150 based on display criteria. For instance, some indicators of operational information may be dragged and dropped onto each other. A graphical element from the section 140, such as graphical indicator 143, may be dragged and dropped onto the timeline graph 210 in the section 130. As a result, system management tool 102 presents an overlay item 402 as shown in FIG. 4. A visual connector 451 appears, which shows a relationship between the overlay item 402 and the graphical indicator 143. However, the visual connector 451 crosses over the non-expanded view 213, partially obscuring some of the operational information presented in the non-expanded view 213. Therefore, the system management tool 102 may rearrange the position of the non-expanded view 213 to snap below the non-expanded view 112. In some instances, when the overlay item 402 is removed, and the visual connector 451 disappears, then the system management tool 102 may rearrange the position of the non-expanded view 213 to snap back above the position of the non-expanded view 112, returning to a default configuration for its relative position.

At block 1208, the system management tool determines whether the input is a drill down operation to an expanded view. If the user input is a drill down to an expanded view, then at block 1210, the system management tool determines whether there is sufficient screen space on the single page to present the drilled down version of the expanded view as well as present the non-expanded views for all other categories. For example, as shown in FIG. 2, the performance detail section 211 includes options to open many detailed graphs related to performance metrics. As long as only one detailed graph is open, such as only timeline graph 210, then there is sufficient space on the single page of the dashboard 104 to present the timeline graph 210 as well as the non-expanded views 112 and 213. However, when more than one detailed graph is open (e.g., both timeline graph 210 and timeline graph 221), then there may not be enough room on the single page to present both the detailed timeline graphs 210 and 221 as well as the non-expanded views 112 and 213.

If there is not sufficient screen space, then at block 1212, the system management tool updates the view features to present the drilled down detail and ensure that all non-expanded views remain visible. For example, referring to FIG. 2, when the timeline graph 221 is presented (which causes more detail to appear in the performance detail section 211), the system management tool 102 can modify presentation of the additional detail by shrinking a vertical size of the timeline graph 210 or timeline graph 221. In another example, the system management tool 102 may position the timeline graphs 210 and 221 next to each other and either reduce the time period of the timeline or shrink the horizontal dimension of the graphs 210 and 221. In another example, the system management tool 102 can determine whether there is additional screen space available on a display of the system management device 181 outside of the window 119 (e.g. determine whether the window 119 is not maximized). If there is additional screen space, the system management tool 102 can cause the window 119 to expand in size sufficient to accommodate the additional detail, yet still maintain presentation of non-expanded views 111 and 112 within the window 119. In some examples, the system management tool 102 can present drill-down detail in a pop up. In yet other examples, the system management tool 102 can cause non-expanded views to snap to desktop widgets, rearrange shapes or orientations, move to frames or toolbars, consolidate data, remove non-important content, resize content to fit into a smaller area, etc. In another example, the system management tool 102 provides the scroll bar 216 for the expanded view 211. For instance, the system management tool 102 sets a height 203 of the expanded view 211 to be less than an entire height 204 of the dashboard 104 so that a combined height 205 of the non-expanded views 112 and 213 fits within the remainder of the visible portion of the dashboard 104 not taken up by the expanded view 211. The scroll bar 216 permits detail for the expanded view 211 to scroll within the section 130.

At block 1214, the system management tool presents the operational information in the view in accordance with display criteria. In some examples, the system management tool presents the operational information as similarly described at block 708 of FIG. 7.

In some examples, the system management tool 102 detects that window 119 is minimized or obscured. For instance, in FIG. 1, the dashboard 104 may be covered up by another window on a display of the system management device 181. In doing so, some of the operational information presented on the dashboard 104 may be obscured by the other window. Consequently, in some examples, when the window 119 is minimized or obscured, the system management tool 102 can cause the non-expanded views 111, 112, and 213 to be automatically presented as windows, widgets, etc. that are separate from the window 119. The system management tool 102 can present the non-expanded views 111, 112, and 213 in places on the display that are still visible. For example, the system management tool 102 may present the non-expanded views 111, 112, and 213 as separate widgets (e.g., gauges, meters, tickers, window bars, etc.) affixed to a desktop taskbar for the display of the system management device 181. The system management tool 102 can also prevent other windows from covering up the widgets. In another example, the system management tool 102 may cause the desktop taskbar to show the operational information from the non-expanded views 111, 112, and 213 (e.g., within empty space of the taskbar). In yet other examples, the system management tool 102 can cause other windows that overlay it in a window stack to become at least partially transparent so that the operational information can be seen through the other windows.

In some examples, the system management tool 102 determines whether a request is made to specify one or more critical events in an expanded view. For instance, as illustrated in FIG. 4, the system management tool 102 presents, in the expanded view 211, one or more graphical indicators that indicate events from the health category and/or the capacity category. For example, the expanded view 211 includes a user-interface control element (dropdown 405) which specifies whether to show events that are related to the capacity category and/or the health category (e.g., the dropdown 405 specifies types of hardware items). The dropdown 405 indicates that critical events (e.g., failures, severe problems, warnings, etc.) pertaining to SSDs will be overlaid onto the timeline graph 210 for the latency metric. After "SSD" is selected from the dropdown 405, the system management tool 102 presents, on the dashboard 104, overlay indicators 412 and 414, which specify times when the critical events occurred to SSDs, such as when a particular SSD failed or experienced a problem. When one of the indicators 412 or 414 is selected (e.g., indicator 414), an overlay item 402, which pertains to the event, appears in the expanded view 211. For instance, the overlay item 402 can appear in response to a mouse click action on the indicator 414. The overlay item 402 illustrates certain information about the event related to the SSD, such as an identifier for the SSD and what problem occurred (e.g., the SSD "failed"). In another example, the overlay item 402 can appear in the expanded view 211 in response to interaction with the non-expanded view 112, such as in response to a mouse over action on the graphical indicator 143.

Variations from Example Illustrations

Although some of the examples refer to looping through views as depicted in FIG. 7, the disclosure and the scope of the claims are not limited to that particular example. A system management tool can instantiate a thread for each category of operational information. Each instantiation can be in accordance with parameters defined for the particular category (e.g., a refresh rate parameter, information source, function library, etc.). Each thread can update the corresponding section independently. In addition, the system management tool can maintain a cache of the operational information. Eviction of the cached operational information can be in accordance with a sliding window of time. Thus, the system management tool can access the cached operational information in response to a drill-down operation instead of retrieving the operational information from a storage operating system or hardware element.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

Aspects of this disclosure are described with reference to flowchart illustrations and/or block diagrams. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 13:
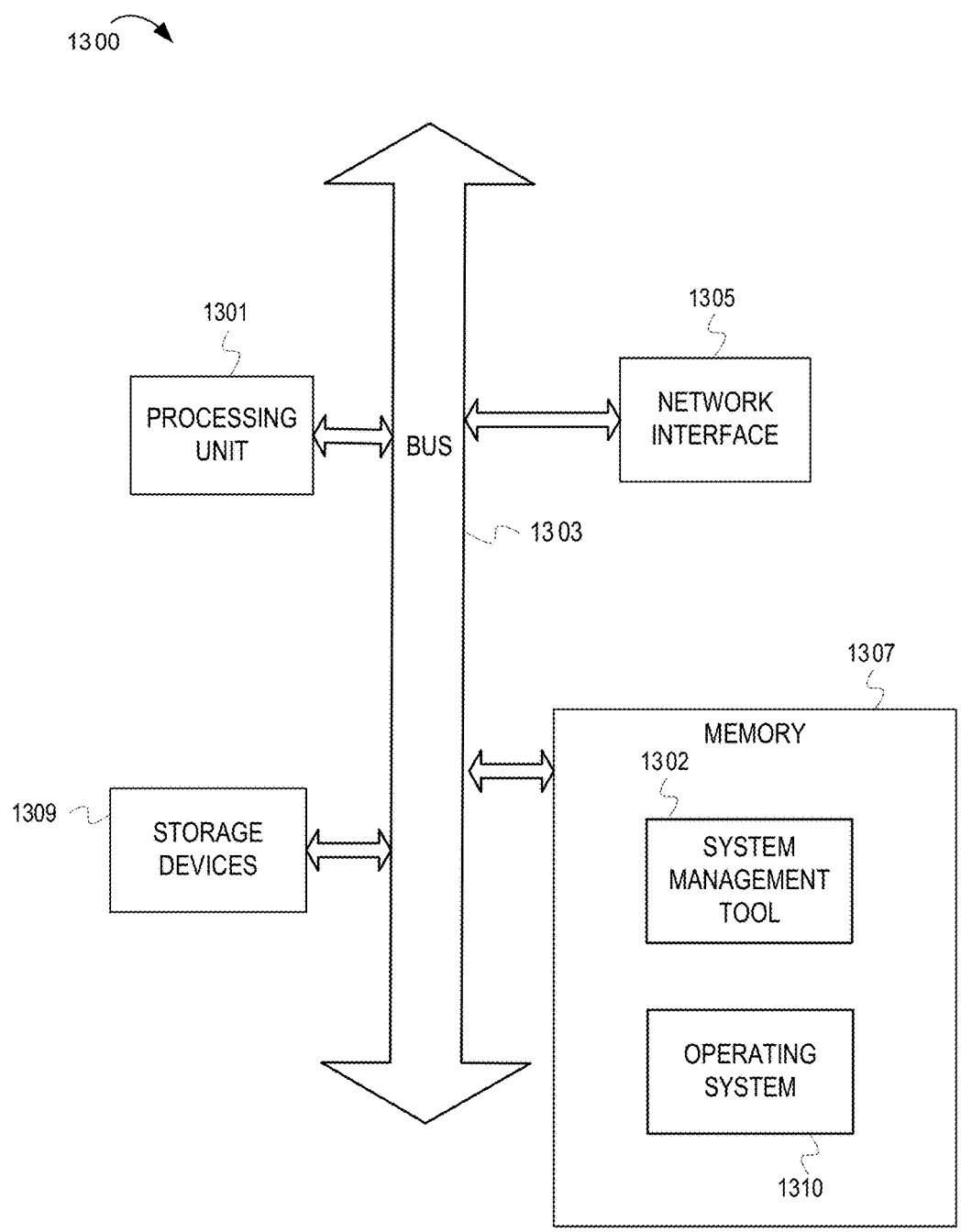
FIG. 13 is an illustration of an example system manager device.

FIG. 13 depicts an example system management device 1300. A system management device 1300 includes a processor unit 1301 (possibly including multiple processors, multiple cores, multiple nodes, and/or implementing multithreading, etc.). The system management device 1300 includes memory 1307. The memory 1307 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The system management device 1300 also includes a bus 1303 (e.g., PCI bus, ISA bus, PCI-Express bus, HyperTransport® bus, InfiniBand® bus, NuBus bus, etc.), a network interface 1305 (e.g., an ATM interface, an Ethernet interface, a Frame Relay interface, SONET interface, wireless interface, etc.), and a storage device(s) 1309 (e.g., optical storage, magnetic storage, etc.). The memory 1307 embodies functionality to implement aspects described above. The memory 1307 may include one or more functionalities that facilitate management of a storage system, and more particularly, organizing metrics and presenting them via a system management tool 1302. The system management tool 1302 is configured to present a dashboard as described previously, which provides a continuous view of the metrics identified as most important for the storage system regardless of the degree of drill-down that occurs for any given type of metric, or in any specific section, of the dashboard. In some examples, the system management tool 1302 communicates with an operating system 1310 of a storage system. Any one of these functionalities may be partially (or entirely) implemented in hardware and/or on the processing unit 1301. For example, the functionality may be implemented with an application specific integrated circuit, in logic implemented in the processing unit 1301, in a co-processor on a peripheral device or card, etc. Further, realizations may include fewer or additional components not illustrated in FIG. 13 (e.g., video cards, audio cards, additional network interfaces, peripheral devices, etc.). The processor unit 1301, the storage device(s) 1309, and the network interface 1305 are coupled to the bus 1303. Although illustrated as being coupled to the bus 1303, the memory 1307 may be coupled to the processor unit 1301.

Figure 14:
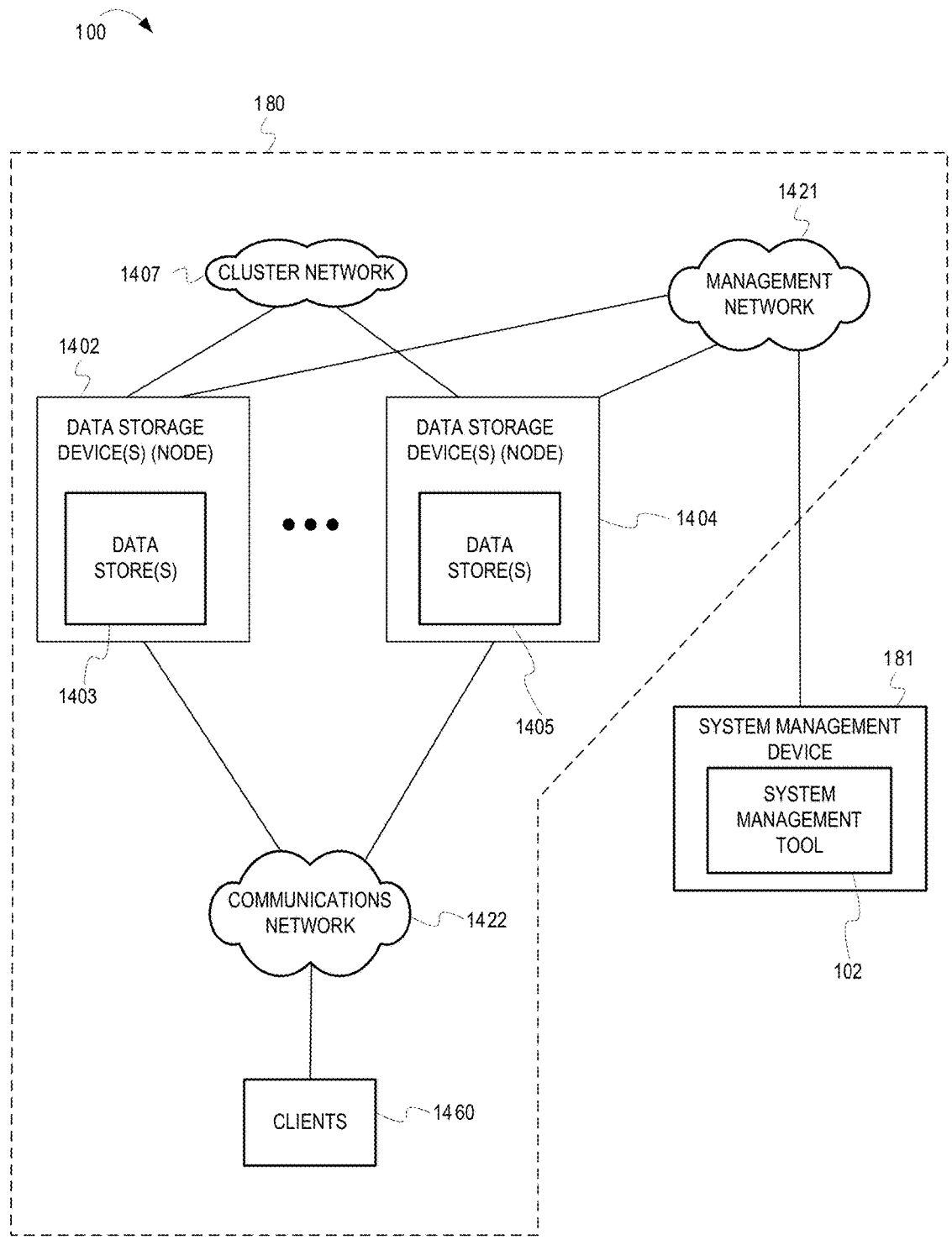
FIG. 14 is an illustration of an example storage system.

FIG. 14 depicts a diagram of the storage system 100. In FIG. 14, the storage system 100 includes the system management device 181, the system management tool 102, and the elements 180 described previously. The storage system 100 also includes a cluster of data storage devices. In FIG. 14, the cluster includes a data storage device(s) 1402 and a data storage device(s) 1404. The system management device 181 is connected to the data storage device via a management network 1421. The cluster of data storage appliances may include storage controllers and/or storage servers. The cluster of data storage appliances are connected together in a computer cluster as part of a cluster network environment. Each of the data storage appliances in the cluster are referred to as nodes. The nodes connect to each other via a cluster network 1407. For instance, the nodes can connect to each other via a cluster network switch associated with the cluster network 1407. The connections that connect the nodes together are referred to as cluster interconnects. The nodes control functions pertaining to data storage. The nodes include data storage equipment, such as tape drives, disk drives, etc. For example, the nodes include data store(s) 1403 and 1405 (which include the SSDs referred to previously). The nodes can also include enclosures, shelves, etc. some of which were mentioned previously. The nodes run separate instances of an operating system (e.g., the NetApp Data ONTAP operating system or the Mars OS). One of the nodes is a node manager that organizes the nodes into a single coherent data storage unit from the perspective of clients 1460. Clients 1460 can access and store data on the data storage unit via a communications network 1422. In some instances, the nodes can provide storage virtualization, such as via use of a virtualized clustered storage array or virtual storage servers. The nodes can further implement storage sub-systems, which include block based storage (e.g., a storage area network (SAN)), a file based storage system (e.g., network attached storage (NAS)), a combination of SAN and NAS, etc.

While specific aspects of the disclosure are described with reference to various implementations and exploitations, it will be understood that these specific aspects are illustrative and are not to limit the scope of all aspects. In general, techniques for providing a timely, compact, and comprehensive summary of operational information of a storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the aspects of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the aspects of the disclosure.

What is claimed is:

1. A method comprising:
collecting, at a memory of a computing device having a processor, operational information about a storage system coupled to the computing device;
presenting, in a graphical user interface (GUI) rendered on a display coupled to the computing device, a digital dashboard presenting the collected operational information by category according to a plurality of views, wherein each of the plurality of views includes a different category of the collected operational information;
displaying, on the digital dashboard, a first view of the plurality of views as an expanded view and a second view of the plurality of views as a non-expanded view, wherein the expanded view includes a different level of detail from the non-expanded view, wherein a collection rate of the collected operational information for the expanded view differs from the collection rate of the collected operational information for the non-expanded view; and
in response to detecting a trigger to expand the non-expanded view, managing presentation of the collected operational information rendered on the display by collapsing the expanded view and rearranging a remaining plurality of views so as to maintain display of all categories of the collected operational information on the dashboard.

2. The method of claim 1 further comprising:
in response to detecting the trigger to expand the non-expanded view, resizing a horizontal dimension of the expanded view of the plurality of views, the expanded view depicted as a timeline graph of the collected operational information; and
reducing a time period of the timeline graph so as to display less of the collected operational information as depicted in the expanded view.

3. The method of claim 1 further comprising:
in response to determining that a value of the collected operational information for a first category exceeds a threshold, displaying in a third view of the plurality of views associated with the first category, an indicator at an initial intensity; and
causing the indicator to fade in intensity over a period of time, after the indicator at the initial intensity is displayed, during which the collected operational information for the first category is below the threshold.

4. The method of claim 1 further comprising:
modifying a refresh rate for the display of the collected operational information for a third view of the plurality of views in proportion to a degree that a value of the collected operational information of the third view approaches a threshold.

5. The method of claim 1 further comprising:
in response to a mouse over trigger event for a first category of the collected operational information of the non-expanded window, displaying an additional view as an overlay, wherein the overlay includes a timeline graph of the collected operational information for the first category.

6. The method of claim 1 further comprising:
performing analytics on a portion of the collected operational information;
predicting a potential failure of a component of the storage system based on the performance of the analytics; and
presenting, in a third view of the plurality of views associated with the component, an indicator of the potential failure.

7. The method of claim 1 wherein collecting further comprises:
caching the collected operational information in the memory, retrieving the displayed operational information from the cache; and
evicting the cached operational information from the memory in accordance with a sliding window of time.

8. The method of claim 1 further comprising:
updating each view of the plurality of views by a respective one of a plurality of independently executing threads on the processor, wherein each respective thread is capable of maintaining a different refresh rate for the collected operational information according to the category of the view.

9. The method of claim 1 wherein managing presentation of the collected operational information further comprises:
in response to the detecting the trigger to expand the non-expanded view, evaluating the trigger against an expansion rule set to determine whether the non-expanded view should be changed in size in response to the trigger.

10. The method of claim 1 further comprising:
synchronizing presentation of the collected operational information for each view of the plurality of views depicting a timeline graph.

11. The method of claim 1 further comprising:
in response to determining that a value of the collected operational information for a first category exceeds a first threshold, displaying in a third view of the plurality of views associated with the first category, a first indicator; and
in response to determining that the value of the collected operational information for the first category exceeds a second threshold, replacing display of the first indicator with a second indicator different from the first indicator.

12. An apparatus comprising:
a processor coupled to a memory;
a storage system coupled to the processor;
a display coupled to the processor; and
a machine-readable medium having program code stored thereon, the program code configured to:
collect operational information about the storage system;
present, in a graphical user interface (GUI) rendered on the display, a digital dashboard presenting the collected operational information by category according to a plurality of views, wherein each of the plurality of views includes a different category of the collected operational information;
display, on the digital dashboard, a first view of the plurality of views as an expanded view and a second view of the plurality of views as a non-expanded view, wherein the expanded view includes a different level of detail from the non-expanded view, wherein a collection rate of the collected operational information for the expanded view differs from the collection rate of the collected operational information of the non-expanded view; and
in response to a detecting a trigger to expand the non-expanded view, manage presentation of the collected operational information rendered on the display by collapsing the expanded view and rearranging a remaining plurality of views so as to maintain display of all categories of the collected operational information on the dashboard.

13. The apparatus of claim 12, wherein the machine-readable medium further has stored therein program code configured to in response to the trigger to expand the non-expanded view:
resize a horizontal dimension of the expanded view of the plurality of views, the expanded view depicted as a timeline graph; and
reduce a time period of the timeline graph so as to display less of the collected operational information.

14. The apparatus of claim 13, wherein the machine-readable medium further has stored therein program code executable by the processor configured to, in response to the trigger to expand the non-expanded view, update each of the plurality of views with the collected operational information.

15. The apparatus of claim 13, wherein the machine-readable medium further has stored therein program code configured to move at least one of the plurality of views that is expanded to a portion of the GUI rendered on the display appearing outside of the digital dashboard.

16. The apparatus of claim 13, wherein the machine-readable medium further has stored therein program code configured to, in response to the trigger to expand the non-expanded view, maintain a relative layout on the dashboard of the plurality of the views.

17. The apparatus of claim 12, wherein the machine-readable medium further has stored therein program code configured to:
provide the collected operational information for each category according to instructions of a set of application program interfaces (APIs) associated with a respective category, wherein the instructions of each API of the set of APIs correspond to a different level of detail of the collected operational information according to a state of expansion of the view associated with the respective category wherein the instructions of at least one API for each set of APIs query an operating system to collect the collected operational information, and wherein the operating system is configured to periodically access sensors of the storage system.

18. The apparatus of claim 12, wherein the machine-readable medium further has stored therein program code configured to:
present a single sample of the collected operational information at a time for each view of a first set of views of the plurality of views that is in a minimized state; and
present a plurality of samples of the collected operational information at a time for each view of a second set of views of the plurality of the views that is in a non-minimized state.

19. The apparatus of claim 12, wherein the categories correspond to one or more of a latency of storage operations of the storage system, an input/output operations per second (IOPS) of the storage system, a storage capacity of one or more storage devices of the storage system, and an operational integrity of one or more hardware elements of the storage system.

* * * * *